United States Patent
Noguchi

(10) Patent No.: US 10,735,103 B2
(45) Date of Patent: Aug. 4, 2020

(54) RECEPTION DEVICE, TRANSMISSION DEVICE, OPTICAL COMMUNICATION SYSTEM AND OPTICAL COMMUNICATION METHOD

(71) Applicant: NEC Corporation, Minato-ku, Tokyo (JP)

(72) Inventor: Hidemi Noguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/473,645

(22) PCT Filed: Dec. 19, 2017

(86) PCT No.: PCT/JP2017/045469
§ 371 (c)(1),
(2) Date: Jun. 26, 2019

(87) PCT Pub. No.: WO2018/123718
PCT Pub. Date: Jul. 5, 2018

(65) Prior Publication Data
US 2020/0052794 A1    Feb. 13, 2020

(30) Foreign Application Priority Data
Dec. 28, 2016 (JP) ................ 2016-255188

(51) Int. Cl.
*H04B 10/079* (2013.01)
*H04B 10/61* (2013.01)
(Continued)

(52) U.S. Cl.
CPC ..... *H04B 10/615* (2013.01); *H04B 10/07953* (2013.01); *H04J 14/02* (2013.01); *H04L 25/03885* (2013.01)

(58) Field of Classification Search
None
See application file for complete search history.

(56) References Cited

U.S. PATENT DOCUMENTS

| 6,944,406 | B1 * | 9/2005 | Way | H04B 10/50 398/182 |
| 8,526,828 | B2 * | 9/2013 | Nakashima | H04B 10/572 398/188 |

(Continued)

FOREIGN PATENT DOCUMENTS

WO    2015120894 A1    8/2015

OTHER PUBLICATIONS

Koji Igarashi et al., "Ultra-Long-Haul High-Capacity Super-Nyquist-WDM Transmission Experiment Using Multi-Core Fibers", Journal of Lightwave Technology, vol. 33, No. 5, Mar. 1, 2015, pp. 1027-1036 (10 pages total).

(Continued)

*Primary Examiner* — Jai M Lee

(57) ABSTRACT

A reception device 20 is configured to include a separation means 21 and a plurality of optical reception means 22. Each optical reception means 22 further includes an optical/electrical conversion means 23, a reception coefficient computation means 24, and a band restoration means 25. The separation means 21 separates a multiplexed signal into which signals of respective channels to which spectral shaping that narrows bandwidth to less than or equal to a baud rate is applied as band narrowing filter processing on the transmission side, based on characteristics of a transmission line are multiplexed at spacings less than or equal to the baud rate. Each band restoration means 25 applies processing having inverse characteristics to those of the band narrowing filter processing to a reception signal, based on the band narrowing parameter acquired by the reception coefficient computation means 24 and thereby restores the band of the reception signal.

20 Claims, 27 Drawing Sheets

(51) Int. Cl.
*H04J 14/02* (2006.01)
*H04L 25/03* (2006.01)

(56) References Cited

U.S. PATENT DOCUMENTS

| | | | | |
|---|---|---|---|---|
| 8,958,510 | B1* | 2/2015 | Harris | H03H 17/0266 |
| | | | | 375/350 |
| 9,124,369 | B2* | 9/2015 | Ji | H04B 10/40 |
| 9,793,984 | B2* | 10/2017 | Sinclair | H04B 10/0795 |
| 9,831,976 | B2* | 11/2017 | Kamura | H04B 10/2569 |
| 9,900,104 | B2* | 2/2018 | McNicol | H04B 10/506 |
| 10,193,713 | B2* | 1/2019 | Li | H04L 25/03012 |
| 2012/0082453 | A1* | 4/2012 | Wu | H04J 14/026 |
| | | | | 398/48 |
| 2013/0223843 | A1* | 8/2013 | Jia | H04J 14/02 |
| | | | | 398/79 |
| 2013/0230316 | A1* | 9/2013 | Hussain | H04J 14/0272 |
| | | | | 398/34 |
| 2013/0315598 | A1* | 11/2013 | Marom | H04J 14/0224 |
| | | | | 398/79 |
| 2014/0294393 | A1* | 10/2014 | Lowery | H04B 10/548 |
| | | | | 398/76 |
| 2014/0356002 | A1* | 12/2014 | Yu | H04B 10/504 |
| | | | | 398/185 |
| 2015/0037034 | A1* | 2/2015 | Renaudier | H04L 1/0035 |
| | | | | 398/65 |
| 2015/0104181 | A1* | 4/2015 | Mazurczyk | H04B 10/2543 |
| | | | | 398/115 |
| 2016/0142154 | A1* | 5/2016 | Jia | H04B 10/6165 |
| | | | | 398/27 |
| 2016/0211939 | A1* | 7/2016 | Yu | H04L 27/34 |
| 2016/0277118 | A1* | 9/2016 | Chatelain | H04B 10/508 |
| 2017/0222716 | A1* | 8/2017 | Nakashima | H04B 10/25 |
| 2017/0310392 | A1* | 10/2017 | Boertjes | H04B 10/07953 |
| 2017/0310416 | A1* | 10/2017 | Li | H04J 14/0256 |
| 2017/0346594 | A1* | 11/2017 | Vassilieva | H04J 14/0267 |
| 2019/0326987 | A1* | 10/2019 | Noguchi | H04J 14/0298 |

OTHER PUBLICATIONS

Written Opinion of the International Searching Authority dated Mar. 20, 2018 in counterpart International Application No. PCT/JP2017/045469.

International Search Report dated Mar. 20, 2018, in counterpart international Application No. PCT/JP2017/045469.

* cited by examiner

SIGNAL SPECTRUM OF NRZ WAVEFORM

SIGNAL SPECTRUM OF NYQUIST WAVEFORM

WAVELENGTH-DIVISION-MULTIPLEXING IMAGE IN NYQUIST METHOD

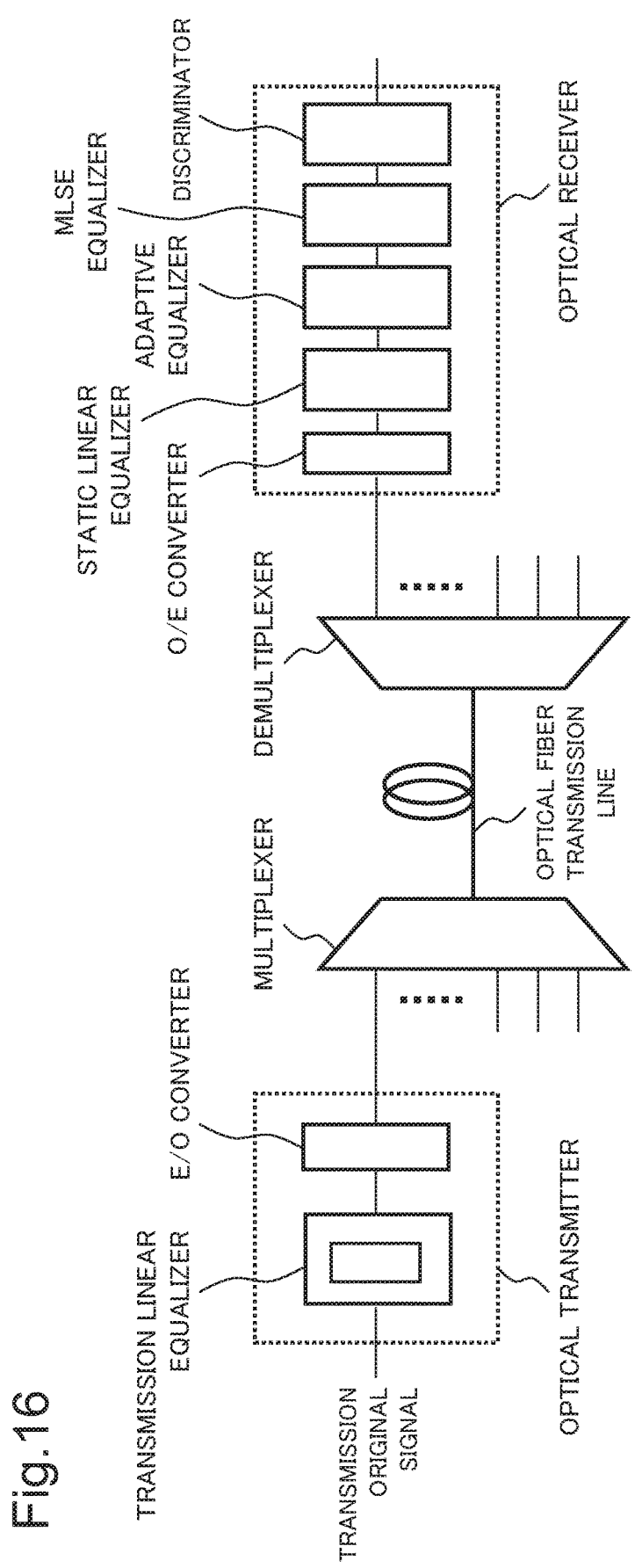

SIGNAL SPECTRUM OF SUPER-NYQUIST WAVEFORM

WAVELENGTH-DIVISION-MULTIPLEXING IMAGE IN SUPER-NYQUIST METHOD

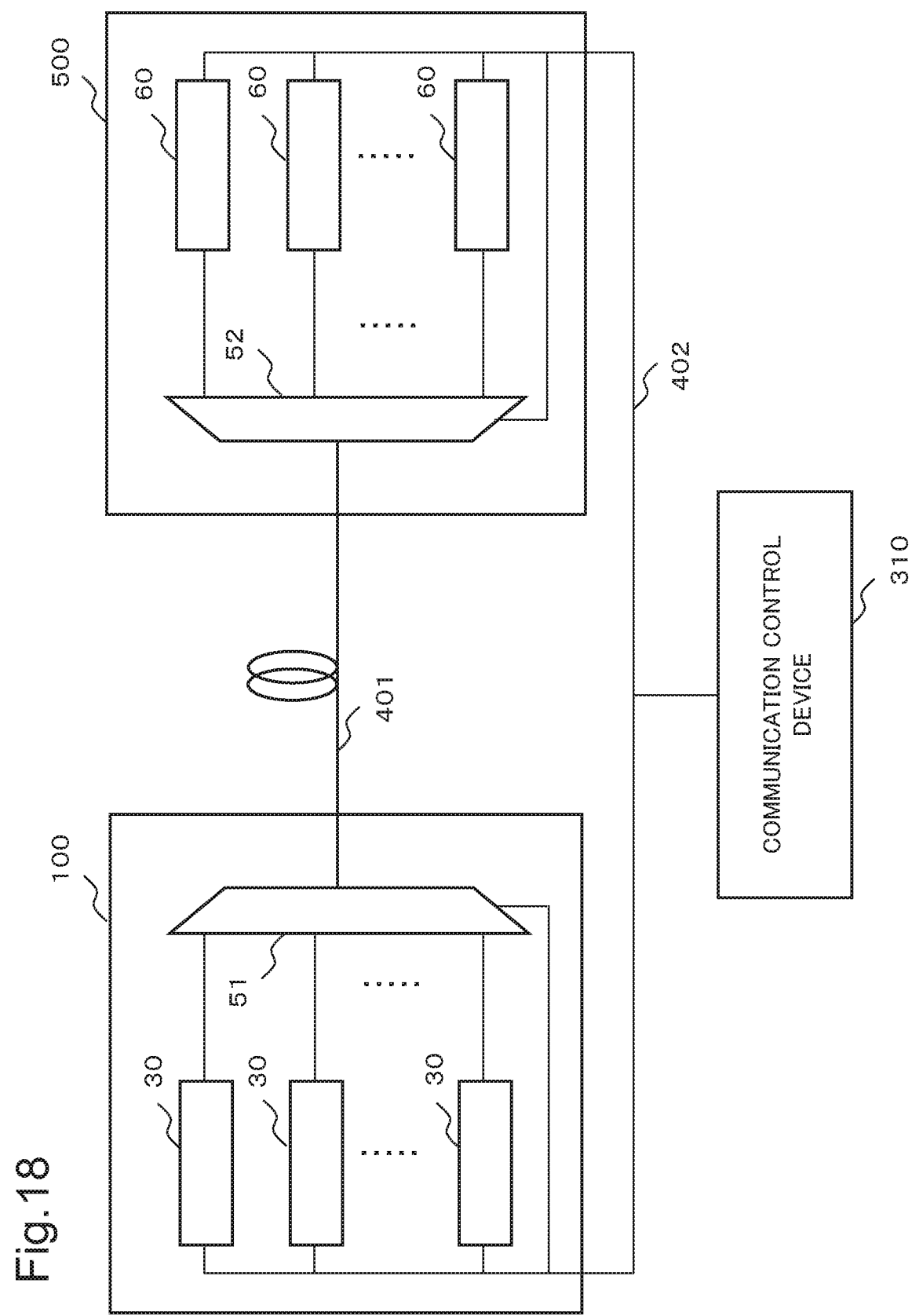

RECEPTION SPECTRUM IMAGE

SPECTRUM MONITORING

RECEPTION DEVICE, TRANSMISSION DEVICE, OPTICAL COMMUNICATION SYSTEM AND OPTICAL COMMUNICATION METHOD

This application is a National Stage Entry of PCT/JP2017/045469 filed on Dec. 19, 2017, which claims priority from Japanese Patent Application 2016-255188 filed on Dec. 28, 2016, the contents of all of which are incorporated herein by reference, in their entirety.

TECHNICAL FIELD

The present invention relates to an optical communication system, and particularly relates to an optical communication system using a super-Nyquist method.

BACKGROUND ART

Recent years, in large capacity trunk line optical communication systems having a capacity of over 100 Giga bit per second (Gbps), a digital coherent method has been used. Such trunk line optical communication systems are sometimes configured as elastic network systems in which offloading of communication traffic to transmission pathways having a light amount of communication traffic and flexible transmission line switching, such as bypassing of a transmission line where a failure has occurred, can be performed. In an optical communication system having such a configuration, it is preferable to continue stable communication even when transmission conditions have changed.

In large capacity trunk line optical communication systems, communication based on a multi-level modulation scheme, such as a quadrature phase shift keying (QPSK) method and 16-quadrature amplitude modulation (QAM), has been put to practical use. Aiming at further increasing capacity, development of higher order multi-level modulation scheme, such as 32-QAM and 64-QAM, has been under way.

In parallel with such capacity increase through multi-level schemes, research and development of transmission methods improving frequency usage efficiency by narrowing signal bands and wavelength-division-multiplexing the signals (wavelength division multiplexer (WDM)) has been actively conducted. Typical examples of such transmission methods include a Nyquist transmission method that enables further band narrowing of signal spectra than transmission based on a non-return zero (NRZ) scheme, which has been widely used so far. Advanced signal bandwidth narrowing technologies, such as a super-Nyquist transmission method in which signal bandwidth is made narrower than a signal baud rate, have also been researched. As described above, an approach to narrow channel spacing at the time of wavelength division multiplex transmission by narrowing signal bandwidth and thereby increase transmission capacity per optical fiber is regarded as important as well as the multi-level scheme.

In particular, for an optical transmission system having a capacity of over 1 Tera bit per second (Tbps), a subcarrier multiplexing method in which a plurality of subcarriers are wavelength-division-multiplexed and 1 Tbps transmission is thereby achieved is effective in consideration of feasibility. Since frequency usage efficiency increases as subcarriers become more densely spaced, a technology for performing transmission through narrowing spacings at which subcarriers are multiplexed becomes important. Thus, development of technologies for performing wavelength-division-multiplexed transmission through narrowing subcarrier spacings has been actively conducted. As the technology for performing wavelength-division-multiplexed transmission through narrowing subcarrier spacings, for example, a technology described in NPL 1 has been disclosed.

An optical transmission system in NPL 1 is a communication system that performs transmission of polarization-multiplexed multi-level optical signals in accordance with the digital coherent method. In the optical transmission system in NPL 1, spectral shaping processing for narrowing the band of main signals is applied. NPL 1 asserts that performing band narrowing, while enabling inter-channel interference to be suppressed, enables wavelength-division-multiplexing spacings to be narrowed.

CITATION LIST

Non Patent Literature

[NPL 1] Koji Igarashi et al., "Ultra-Long-Haul High-Capacity Super-Nyquist-WDM Transmission Experiment Using Multi-Core Fibers", JOURNAL OF LIGHTWAVE TECHNOLOGY, Mar. 1, 2015, VOL. 33, NO. 5, p 1027-1036

SUMMARY OF INVENTION

Technical Problem

However, the technology in NPL 1 is not sufficient in respect of the following point. When the band narrowing processing that narrows bandwidth to less than a signal baud rate is applied to signals to be transmitted, the Nyquist's first criterion becomes not satisfied, which causes distortion to occur on main signal waveforms. As the band is made narrower, influence from such waveform distortion becomes more notable and substantially deteriorates transmission characteristics. In NPL 1, a method of, against such characteristic deterioration due to waveform distortion, restoring transmission symbols using a maximum likelihood estimation algorithm, typified by a maximum likelihood sequence estimation (MLSE) equalizer is disclosed.

Meanwhile, in an optical communication system typified by an elastic network system, transmission characteristics sometimes vary influenced by noise in a transmission line caused by rearrangement of pathways and/or band narrowing in association with signals passing through reconfigurable optical add/drop multiplexer (ROADM) equipment. In the MLSE equalizer using a maximum likelihood estimation algorithm disclosed in the optical transmission system in NPL 1, there occurs a problem in that, because of complexity of the algorithm, parameter optimization requires a certain amount of time to converge and does not converge in some cases. For this reason, the MLSE equalizer cannot promptly respond to variation in transmission characteristics occurring in an elastic network system. Therefore, the technology in NPL 1 is not sufficient as a technology for performing optimum high-density wavelength division multiplexing according to transmission conditions and thereby improving frequency usage efficiency when switching of pathways of the transmission line is performed.

An object of the present invention is to, in order to solve the above-described problem, obtain a reception device, a transmission device, and an optical communication method that enable optimum high-density wavelength division multiplexing according to transmission conditions to be performed and thereby enables frequency usage efficiency to be improved even when switching of pathways of a transmission line is performed.

Solution to Problem

In order to solve the above-described problem, a transmission device of the present invention includes a plurality of optical transmission means and a multiplexing means. Each optical transmission means further includes a transmission coefficient computation means, a band narrowing means, and an electrical/optical conversion means. Each transmission coefficient computation means acquires a parameter indicating a degree of bandwidth narrowing when spectral shaping that narrows bandwidth of a signal to less than or equal to a baud rate is performed, as a band narrowing parameter that is set based on characteristics of a transmission line transmitting optical signals. Each transmission coefficient computation means computes a filter coefficient when processing of narrowing bandwidth of a signal is applied as band narrowing filter processing. Each band narrowing means, based on a filter coefficient computed by a transmission coefficient computation means, applies processing of narrowing bandwidth of a signal as band narrowing filter processing. Each electrical/optical conversion means acquires, as a wavelength-division-multiplexing spacing parameter, information of center wavelengths of optical signals for respective channels and a spacing between the center wavelengths that are set based on characteristics of the transmission line and converts a signal the bandwidth of which is narrowed to less than or equal to the baud rate by a band narrowing means to an optical signal, based on the wavelength-division-multiplexing spacing parameter. The multiplexing means wavelength-division-multiplexes optical signals of respective channels output from the plurality of optical transmission means into a multiplexed signal, at spacings less than or equal to the baud rate and outputs the multiplexed signal to the transmission line.

A reception device of the present invention includes a separation means and a plurality of optical reception means. Each optical reception means further includes an optical/electrical conversion means, a reception coefficient computation means, and a band restoration means. The separation means receives a multiplexed signal into which signals of respective channels to which spectral shaping that narrows bandwidth to less than or equal to a baud rate is applied as band narrowing filter processing on a transmission side are wavelength-division-multiplexed at spacings less than or equal to the baud rate and separates the multiplexed signal into the optical signals for the respective channels. The band narrowing filter processing is applied based on a band narrowing parameter that, based on characteristics of a transmission line transmitting optical signals, is set as a parameter indicating a degree of bandwidth narrowing of a signal. Each optical/electrical conversion means acquires, as a wavelength-division-multiplexing spacing parameter, information of center wavelengths of optical signals for the respective channels and a spacing between the center wavelengths that are set based on characteristics of the transmission line. Each optical/electrical conversion means converts an optical signal of an assigned channel to an electrical signal, based on the wavelength-division-multiplexing spacing parameter and outputs the electrical signal as a reception signal. Each reception coefficient computation means acquires the band narrowing parameter and, based on the band narrowing parameter, computes a filter coefficient when processing having inverse characteristics to those of the band narrowing filter processing applied on the transmission side is applied to a reception signal as band restoration filter processing. Each band restoration means applies the band restoration filter processing to a reception signal, based on a filter coefficient computed by a reception coefficient computation means and thereby restores a band of the reception signal.

An optical communication method of the present invention separates a multiplexed signal into which signals of respective channels to which spectral shaping that narrows bandwidth of a signal to less than or equal to a baud rate is applied as band narrowing filter processing are wavelength-division-multiplexed at spacings less than or equal to the baud rate into optical signals of the respective channels. The band narrowing filter processing is applied based on a band narrowing parameter that, based on characteristics of a transmission line transmitting optical signals, is set as a parameter indicating a degree of bandwidth narrowing of a signal. The optical communication method of the present invention acquires information of center wavelengths of optical signals for the respective channels and a spacing between the center wavelengths that are set based on characteristics of a transmission line, as a wavelength-division-multiplexing spacing parameter. The optical communication method of the present invention converts the optical signals of the assigned channels to electrical signals, based on the wavelength-division-multiplexing spacing parameter. The optical communication method of the present invention acquires the band narrowing parameter and, based on the band narrowing parameter, computes a filter coefficient when processing having inverse characteristics to those of the band narrowing filter processing is applied to the reception signals as band restoration filter processing. The optical communication method of the present invention applies the band restoration filter processing to the reception signals, based on the computed filter coefficient and thereby restores bands of the reception signals.

Advantageous Effects of Invention

The present invention enables optimum high-density wavelength division multiplexing according to transmission conditions to be promptly performed and thereby enables frequency usage efficiency to be improved even when switching of pathways of a transmission line is performed.

BRIEF DESCRIPTION OF DRAWINGS

FIG. 16 is a diagram illustrating an example of a configuration of another optical communication system having a configuration for comparison with the present invention;

FIG. 18 is a diagram illustrating an outline of a configuration of a third example embodiment according to the present invention;

EXAMPLE EMBODIMENT

Figure 1:
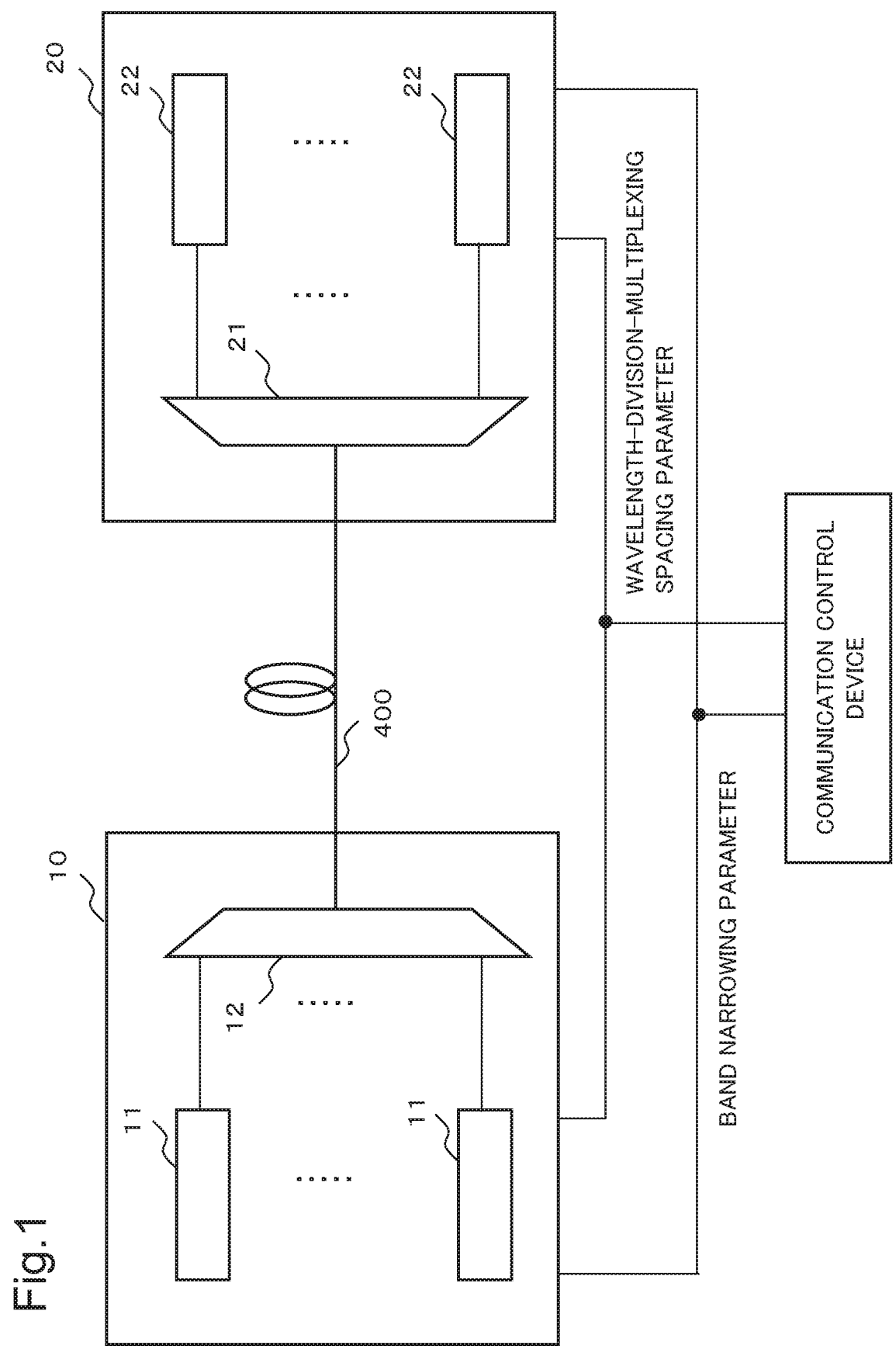
FIG. 1 is a diagram illustrating an outline of a configuration of a first example embodiment according to the present invention.

A first example embodiment of the present invention will be described in detail with reference to the drawings. FIG. 1 is a diagram illustrating an outline of a configuration of an optical communication system of the present example embodiment. The optical communication system of the present example embodiment includes a transmission device 10 and a reception device 20. The transmission device 10 and the reception device 20 are interconnected via a transmission line 400.

Figure 2:
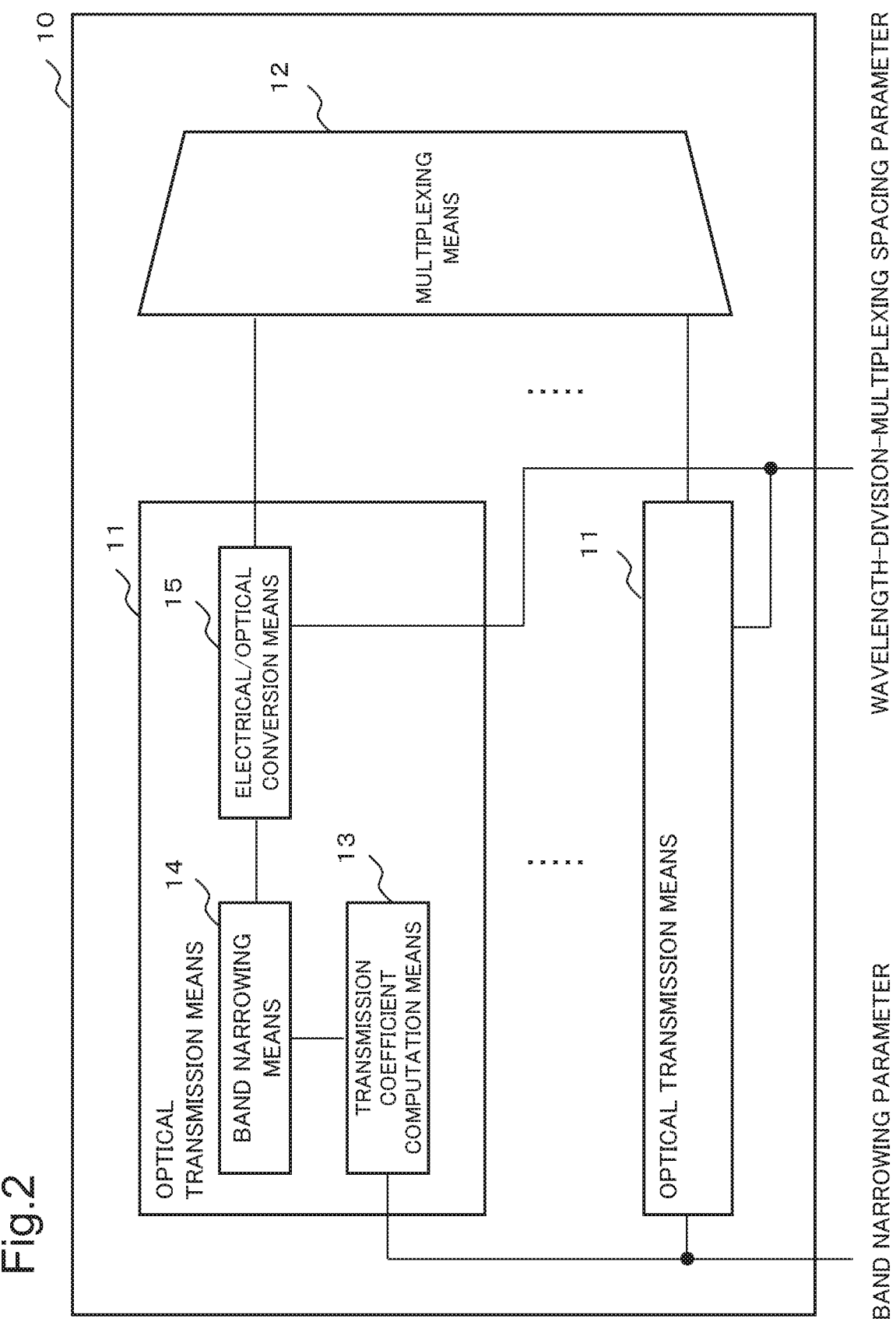
FIG. 2 is a diagram illustrating a configuration of a transmission device of the first example embodiment according to the present invention.

A configuration of the transmission device 10 will be described. FIG. 2 is a diagram illustrating an outline of the configuration of the transmission device 10 of the present example embodiment. The transmission device 10 of the present example embodiment includes a plurality of optical transmission means 11 and a multiplexing means 12. Each optical transmission means 11 further includes a transmission coefficient computation means 13, a band narrowing means 14, and an electrical/optical conversion means 15. Each transmission coefficient computation means 13 acquires a parameter indicating a degree of bandwidth narrowing when spectral shaping that narrows bandwidth of a signal to less than or equal to a baud rate is performed, as a band narrowing parameter that is set based on characteristics of a transmission line transmitting optical signals. Each transmission coefficient computation means 13 computes a filter coefficient when processing of narrowing bandwidth of a signal is applied as band narrowing filter processing. Each band narrowing means 14 applies processing of narrowing bandwidth of a signal as the band narrowing filter processing, based on the filter coefficient that a transmission coefficient computation means 13 has computed. Each electrical/optical conversion means 15 acquires information of center wavelengths of optical signals of respective channels and a spacing between the center wavelengths that are set based on characteristics of the transmission line, as a wavelength-division-multiplexing spacing parameter. Each electrical/optical conversion means 15 converts a signal the bandwidth of which a band narrowing means 14 has narrowed to less than or equal to the baud rate to an optical signal, based on the wavelength-division-multiplexing spacing parameter. The multiplexing means 12 wavelength-division-multiplexes optical signals of the respective channels output from the plurality of optical transmission means 11 into a multiplexed signal at spacings less than or equal to the baud rate and outputs the multiplexed signal to the transmission line. Each electrical/optical conversion means 15 includes a digital/analog conversion means that converts a digital signal having been subjected to the band narrowing filter processing in the digital domain to an analog electrical signal. The digital/analog conversion means is omitted in FIG. 2.

Figure 3:
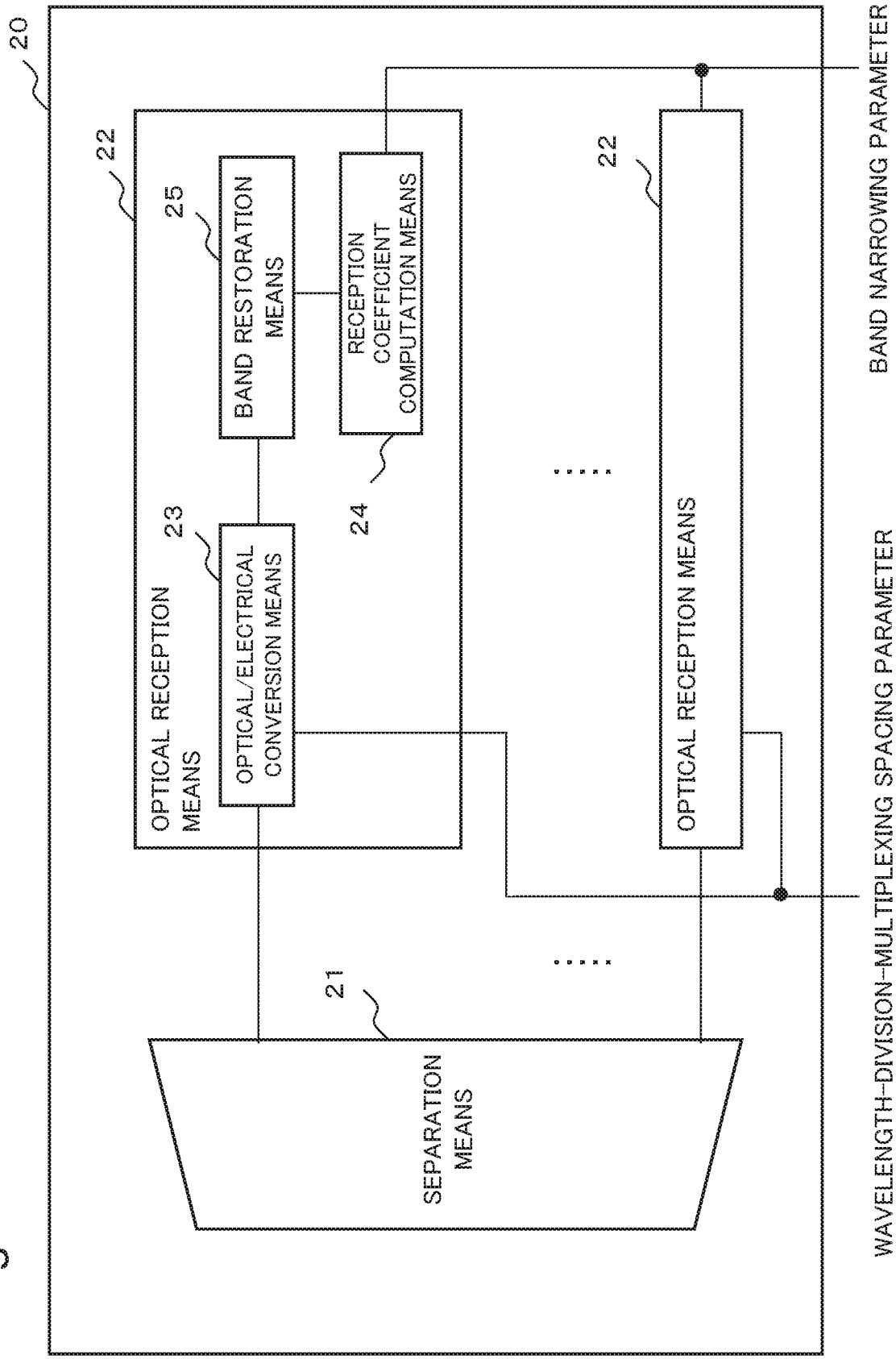
FIG. 3 is a diagram illustrating a configuration of a reception device of the first example embodiment according to the present invention.

FIG. 3 is a diagram illustrating an outline of a configuration of the reception device 20 of the present example embodiment. The reception device 20 of the present example embodiment includes a separation means 21 and a plurality of optical reception means 22. Each optical reception means 22 further includes an optical/electrical conversion means 23, a reception coefficient computation means 24, and a band restoration means 25. The separation means 21 receives a multiplexed signal into which signals of the respective channels to which spectral shaping, which narrows bandwidth to less than or equal to a baud rate, is applied as the band narrowing filter processing are wavelength-division-multiplexed at spacings less than or equal to the baud rate on the transmission side and separates the received multiplexed signal into optical signals for the respective channels. The band narrowing filter processing is applied based on a band narrowing parameter that is set as a parameter indicating a degree of signal bandwidth narrowing, based on characteristics of a transmission line transmitting optical signals. Each optical/electrical conversion means 23 acquires information of center wavelengths of optical signals of the respective channels and a spacing between the center wavelengths that are set based on characteristics of the transmission line, as a wavelength-division-multiplexing spacing parameter. Each optical/electrical conversion means 23 converts an optical signal of an assigned channel to an electrical signal, based on the wavelength-division-multiplexing spacing parameter and outputs the electrical signal as a reception signal. Each reception coefficient computation means 24 acquires the band narrowing parameter and, based on the band narrowing parameter, computes a filter coefficient when filter processing having inverse characteristics to those of the band narrowing filter processing applied on the transmission side is applied to a reception signal as band restoration filter processing. Each band restoration means 25 applies the band restoration filter processing to a reception signal, based on the filter coefficient computed by a reception coefficient computation means 24 and thereby restores the band of the reception signal. Each optical/electrical conversion means 23 includes an analog/digital conversion means that converts an analog signal that has been converted from an optical signal to an electrical signal to a digital signal. The analog/digital conversion means is omitted in FIG. 3.

The transmission device 10 of the present example embodiment acquires a band narrowing parameter and a wavelength-division-multiplexing spacing parameter, which are set based on characteristics of the transmission line when optical signals are transmitted. Each transmission coefficient computation means 13 performs spectral shaping processing that narrows bandwidth of a signal to less than or equal to the baud rate in a band narrowing means 14, based on the acquired band narrowing parameter. In the transmission device 10 of the present example embodiment, each electrical/optical conversion means 15 converts a signal to which the band narrowing has been applied to an optical signal, based on the wavelength-division-multiplexing spacing parameter. The multiplexing means 12 wavelength-division-multiplexes optical signals of the respective channels that the electrical/optical conversion means 15 have converted and that are output from the plurality of optical transmission means 11 into a multiplexed signal, at wavelength spacings less than or equal to the baud rate and outputs the multiplexed signal to the transmission line. Thus, the transmission device 10 of the present example embodiment is capable of applying the band narrowing filter processing to signals in such a way that the signals have optimum bandwidth, based on characteristics of the transmission line and transmitting optical signals by multiplexing the optical signals at optimum wavelength spacings, based on the characteristics of the transmission line.

The reception device 20 of the present example embodiment acquires the band narrowing parameter and the wavelength-division-multiplexing spacing parameter, which are set based on characteristics of the transmission line when optical signals are transmitted. The reception device 20 of the present example embodiment separates a multiplexed signal into which signals of the respective channels are wavelength-division-multiplexed at spacings less than or equal to the baud rate into optical signals for the respective channels in the separation means 21 and converts the optical signals to electrical signals, based on the wavelength-division-multiplexing spacing parameter in the optical/electrical conversion means 23. The reception device 20 of the present example embodiment applies band restoration filter processing having inverse characteristics to those of the band narrowing filter processing, which was applied on the transmission side, based on the band narrowing parameter in the band restoration means 25.

Thus, the reception device 20 of the present example embodiment is capable of separating an optical signal into which signals are wavelength-division-multiplexed at optimum wavelength spacings according to characteristics of the transmission line into reception signals and restoring the reception signals to which the band narrowing filter processing was applied to signals having signal spectra closer to those of signals before band narrowing. As described above, use of the transmission device 10 and the reception device 20 of the present example embodiment enables transmission of a multiplexed signal into which signals are wavelength-division-multiplexed at optimum wavelength spacings according to characteristics of the transmission line to be performed. Therefore, use of the transmission device 10 and the reception device 20 of the present example embodiment enables transmission of wavelength-division-multiplexed signals under an optimum condition to be established without requiring a long period of time even when change has occurred in the pathways and characteristics of the transmission line. As a result, use of the transmission device 10 and the reception device 20 of the present example embodiment enables optimum high-density wavelength division multiplexing according to transmission conditions and thereby enables frequency usage efficiency to be improved even when switching of pathways of the transmission line is performed.

In the optical communication system of the present example embodiment, the band narrowing parameter and the wavelength-division-multiplexing spacing parameter are sent from a communication control device to both the transmission device 10 and the reception device 20. The communication control device includes a parameter computation means and a parameter transmission means. The parameter computation means computes the band narrowing parameter, which indicates information of bandwidth when the spectral shaping, which narrows bandwidth to less than or equal to the baud rate, is applied to signals of the respective channels, based on information of pathways of the transmission line for optical signals and characteristics of the transmission line. The parameter computation means computes the wavelength-division-multiplexing spacing parameter, which indicates center wavelengths of optical signals of the respective ones of the plurality of channels and a wavelength spacing between the center wavelengths, based on information of pathways of the transmission line for optical signals and characteristics of the transmission line. The parameter transmission means transmits the band narrowing parameter and the wavelength-division-multiplexing spacing parameter to both the transmission side and the reception side of optical signals.

When a configuration using the communication control device as described above is employed, the transmission device 10 receives the band narrowing parameter and the wavelength-division-multiplexing spacing parameter from the communication control device and applies the band narrowing filter processing to signals, based on the band narrowing parameter. In addition, the transmission device 10 converts signals to which the band narrowing filter processing has been applied to optical signals, based on the wavelength-division-multiplexing spacing parameter, wavelength-division-multiplexes the optical signals of a plurality of channels into a multiplexed signal, and transmits the multiplexed signal to the transmission line 400. The reception device 20 receives the band narrowing parameter and the wavelength-division-multiplexing spacing parameter from the communication control device and converts optical signals into which a multiplexed signal received from the transmission device 10 via the transmission line 400 are separated to electrical signals, based on the wavelength-division-multiplexing spacing parameter. The reception device 20 applies the band restoration filter processing to reception signals, which have been converted into electrical signals, based on the band narrowing parameter. As described above, in the communication system of the present example embodiment, the transmission device 10 and the reception device 20 operate using the band narrowing parameter and the wavelength-division-multiplexing spacing parameter that the communication control device generates and that are based on characteristics of the transmission line. For this reason, the optical communication system of the present example embodiment enables optimum high-density wavelength division multiplexing according to transmission conditions to be promptly performed and thereby enables frequency usage efficiency to be improved even when switching of pathways of the transmission line is performed.

SECOND EXAMPLE EMBODIMENT

Figure 4:
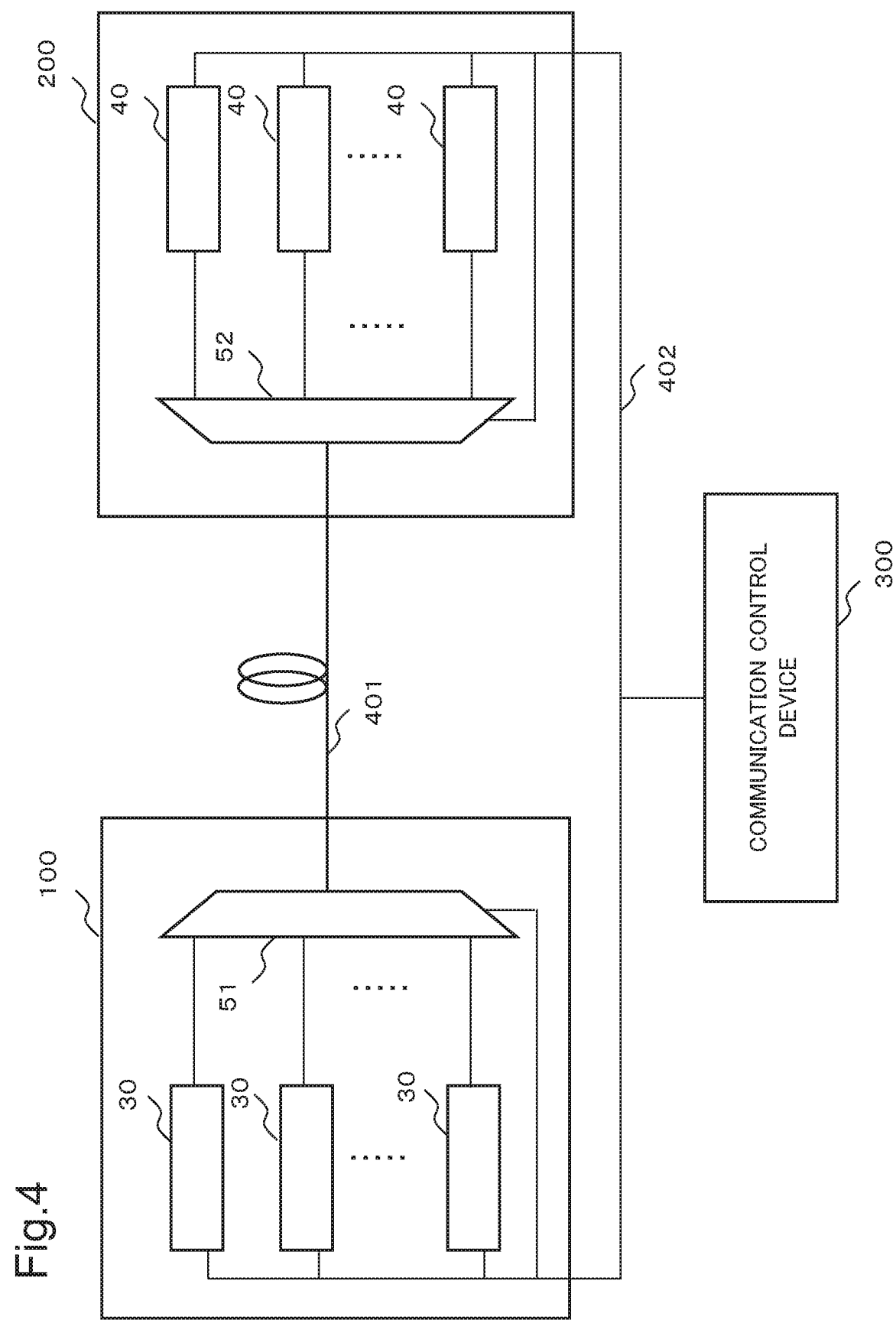
FIG. 4 is a diagram illustrating an outline of a configuration of a second example embodiment according to the present invention.

A second example embodiment of the present invention will be described in detail with reference to the drawings. FIG. 4 is a diagram illustrating an outline of a configuration of an optical communication system of the present example embodiment. The optical communication system of the present example embodiment includes a transmission device 100, a reception device 200, and a communication control device 300. The transmission device 100 and the reception device 200 are interconnected via an optical fiber transmission line 401. The communication control device 300 is connected to the transmission device 100 and the reception device 200 via a communication line 402.

The optical communication system of the present example embodiment is a digital optical communication system that transmits a wavelength-division-multiplexed optical signal from the transmission device 100 to the reception device 200 via the optical fiber transmission line 401. The optical communication system of the present example embodiment performs communication using a digital coherent method in which subcarriers are multiplexed. The communication system of the present example embodiment performs communication in a super-Nyquist transmission method in which subcarriers having bandwidth less than or equal to a baud rate are wavelength-division-multiplexed at wavelength spacings less than or equal to the baud rate.

The transmission device 100 includes a plurality of optical transmitters 30 and a multiplexer 51. The transmission device 100 transmits a wavelength-division-multiplexed signal into which subcarriers that are generated by the respective optical transmitters 30, correspond to respective channels, and have bandwidth less than or equal to the baud rate are wavelength-division-multiplexed at wavelength spac-ings less than or equal to the baud rate by the multiplexer 51 to the optical fiber transmission line 401.

Figure 5:
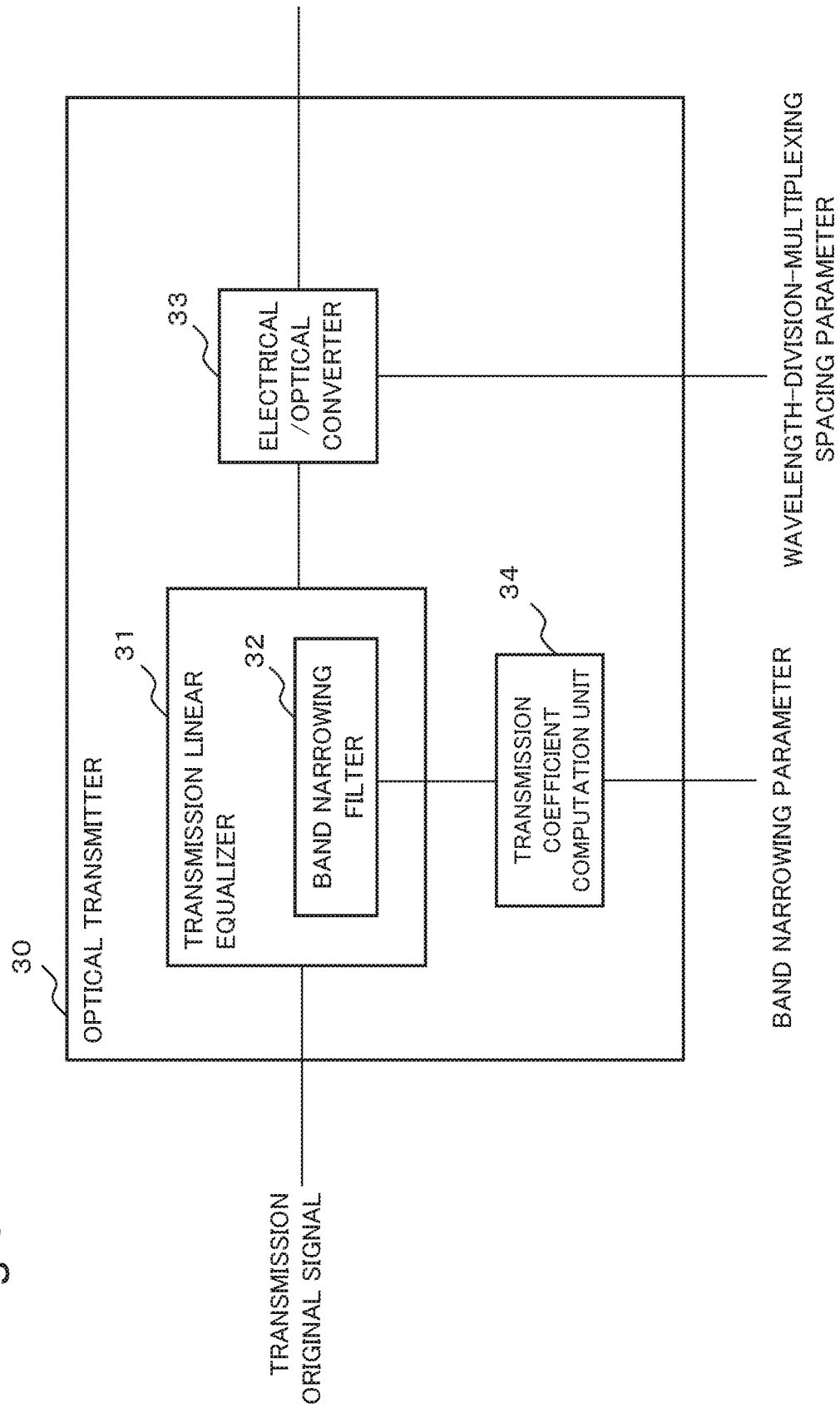
FIG. 5 is a diagram illustrating a configuration of an optical transmitter of the second example embodiment according to the present invention.

A configuration of each optical transmitter 30 will be described. FIG. 5 is a diagram illustrating the configuration of the optical transmitter 30 of the present example embodiment. The optical transmitter 30 includes a transmission linear equalizer 31, an electrical/optical converter 33, and a transmission coefficient computation unit 34. The transmission linear equalizer 31 further includes a band narrowing filter 32. The optical transmitter 30 of the present example embodiment is equivalent to the optical transmission means 11 of the first example embodiment.

The transmission linear equalizer 31 band-limits signal bandwidth of a transmission original signal to less than or equal to the baud rate, using the band narrowing filter 32. A filter shape when the band limitation is performed through application of filter processing to a transmission original signal, using the band narrowing filter 32 is input from the transmission coefficient computation unit 34 as a filter coefficient. The transmission linear equalizer 31 of the present example embodiment is equivalent to the band narrowing means 14 of the first example embodiment.

The electrical/optical converter 33 converts an electrical signal input from the transmission linear equalizer 31 to an optical signal and outputs the optical signal. The electrical/optical converter 33 includes a light source and a modulator that modulates light output from the light source, based on an electrical signal input from the transmission linear equalizer 31. As the light source, a semiconductor laser is used. As the modulator, for example, a Mach-Zehnder modulator is used. Wavelength of light that the electrical/optical converter 33 outputs is variable. The electrical/optical converter 33 adjusts the center wavelength of an optical signal to be output based on the information of center wavelengths that is sent as the wavelength-division-multiplexing spacing parameter. In the communication system of the present example embodiment, the electrical/optical converter 33 of each optical transmitter 30 outputting an optical signal having a center wavelength based on the wavelength-division-multiplexing spacing parameter causes the wavelength spacing of a multiplexed signal to be determined. An optical signal output from the electrical/optical converter 33 is sent to the multiplexer 51 as a subcarrier. The electrical/optical converter 33 of the present example embodiment is equivalent to the electrical/optical conversion means 15 of the first example embodiment.

The transmission coefficient computation unit 34 computes a filter shape of the band narrowing filter 32 as a filter coefficient, based on the band narrowing parameter input from the communication control device 300. To the transmission coefficient computation unit 34 and the reception coefficient computation unit 46 in an optical transmitter 30 and an optical receiver 40 that correspond to each other, the same band narrowing parameter is transmitted from the communication control device 300. That is, each transmission coefficient computation unit 34 shares information of the band narrowing parameter with one of the optical receivers 40 of the reception device 200 via the communication control device 300. The transmission coefficient computation unit 34 sends the computed filter coefficient to the band narrowing filter 32. The transmission coefficient computation unit 34 of the present example embodiment is equivalent to the transmission coefficient computation means 13 of the first example embodiment.

The multiplexer 51 wavelength-division-multiplexes optical signals input from the respective optical transmitters 30 as subcarriers into a multiplexed signal and outputs the multiplexed signal to the optical fiber transmission line 401. The multiplexer 51 multiplexes subcarriers that are sent from the plurality of optical transmitters 30 and have wavelength spacings less than or equal to the baud rate therebetween into a multiplexed signal at wavelength spacings based on the wavelength-division-multiplexing spacing parameter and outputs the multiplexed signal. The multiplexer 51 is, for example, constituted by a wavelength selective switch (WSS). In a case of a configuration in which a transmitted wavelength is required to be selected, the multiplexer 51 sets the transmitted wavelength, based on the wavelength-division-multiplexing spacing parameter. The multiplexer 51 receives the wavelength-division-multiplexing spacing parameter from the communication control device 300 via the communication line 402. The multiplexer 51 may be constituted by an optical element of another type that has the multiplexing function, such as a variable optical filter and an optical coupler. The multiplexer 51 of the present example embodiment is equivalent to the multiplexing means 12 of the first example embodiment.

The reception device 200 includes a plurality of optical receivers 40 and a demultiplexer 52. The reception device 200 separates a multiplexed signal that is transmitted via the optical fiber transmission line 401 and into which subcarriers were wavelength-division-multiplexed at wavelength spacings less than or equal to the baud rate into reception signals, using the demultiplexer 53 and performs processing on the reception signals, using the optical receivers 40 corresponding to the respective channels. The optical transmitters 30 of the transmission device 100 and the optical receivers 40 of the reception device 200 are provided in a corresponding number to the number of channels when communication is performed using the optical communication system.

Figure 6:
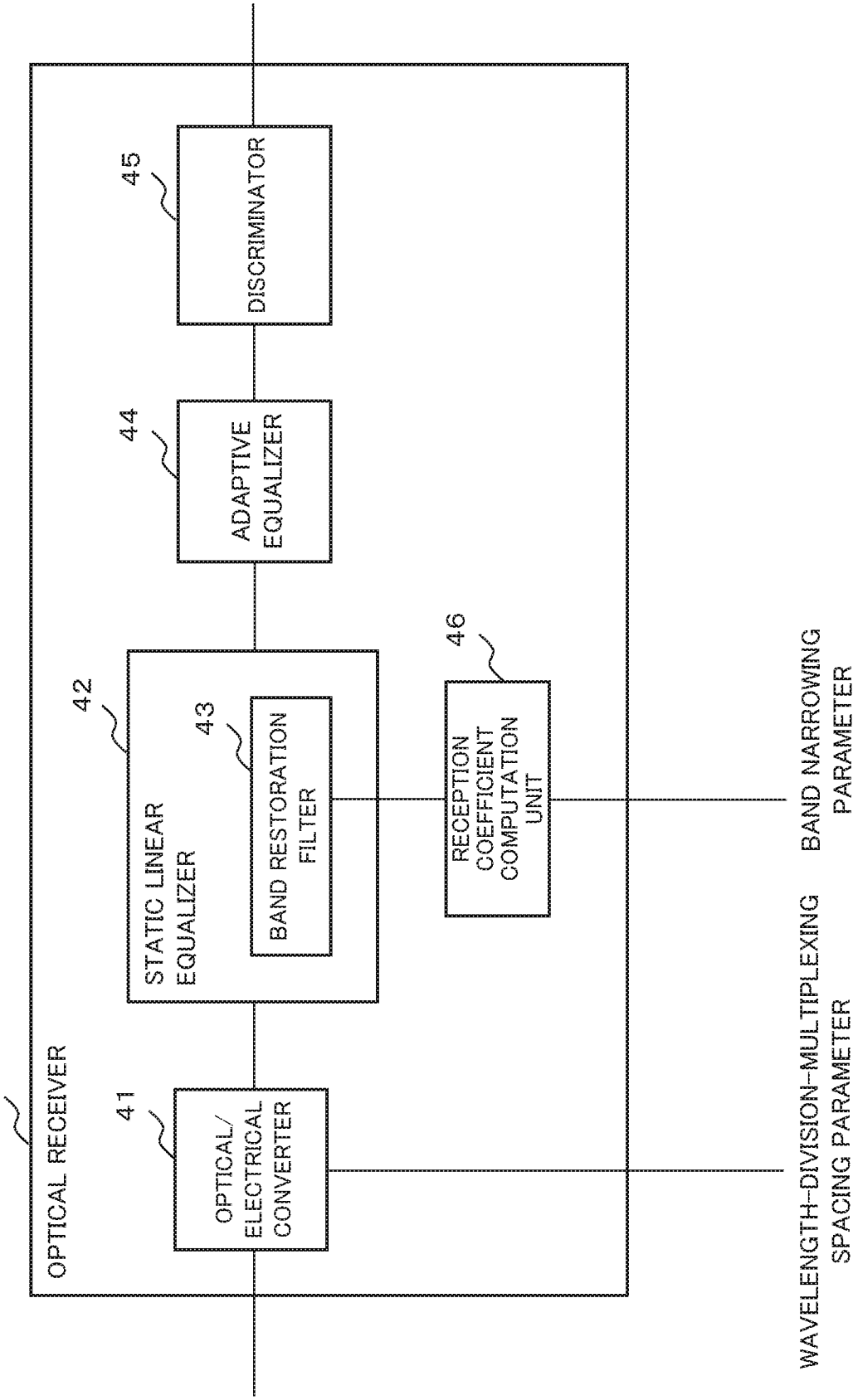
FIG. 6 is a diagram illustrating a configuration of an optical receiver of the second example embodiment according to the present invention.

A configuration of each optical receiver 40 will be described. FIG. 6 is a diagram illustrating the configuration of the optical receiver 40 of the present example embodiment. The optical receiver 40 includes an optical/electrical converter 41, a static linear equalizer 42, an adaptive equalizer 44, a discriminator 45, and a reception coefficient computation unit 46. The static linear equalizer 42 further includes a band restoration filter 43. The optical receiver 40 of the present example embodiment is equivalent to the optical reception means 22 of the first example embodiment.

The optical/electrical converter 41 converts an optical signal input from the demultiplexer 52 to an electrical signal. The optical/electrical converter 41 includes a light receiving element that converts an input optical signal to an electrical signal. The optical/electrical converter 41 is constituted by a light source that outputs local oscillator light for coherent detection, a photodiode, and the like. The optical/electrical converter 41 sends a reception signal converted to an electrical signal to the static linear equalizer 42 as a digital signal. The optical/electrical converter 41 varies the wavelength of the local oscillator light, based on the wavelength-division-multiplexing spacing parameter received from the communication control device 300 via the communication line 402 and thereby adjusts the wavelength of optical signals to be received. The optical/electrical converter 41 of the present example embodiment is equivalent to the optical/electrical conversion means 23 of the first example embodiment.

The static linear equalizer 42 has a function of restoring a band of a signal in addition to static waveform distortion compensation that is generally performed in the digital coherent method, such as wavelength dispersion compensation in which waveform distortion due to wavelength dispersion generated in the optical fiber transmission line 401 is compensated for. The static linear equalizer 42 performs filter processing having inverse characteristics to the band narrowing filter processing, which was applied on the transmission side, and thereby restores a band.

The static linear equalizer 42 performs filter processing having inverse characteristics to those of the band narrowing filter processing, which was applied on the transmission side, using the band restoration filter 43 and thereby restores a band of a reception signal. The band restoration filter 43 performs the restoration of a band, based on a minimum mean square error (MMSE) criterion. A filter shape used when the band restoration filter 43 applies the band restoration processing to a reception signal is input from the reception coefficient computation unit 46 as a filter coefficient. The reception signal that has been subjected to the band restoration processing in the band restoration filter 43 is sent to the adaptive equalizer 44. The static linear equalizer 42 of the present example embodiment is equivalent to the band restoration means 25 of the first example embodiment.

The adaptive equalizer 44 applies adaptive equalization processing for achieving dynamic waveform shaping processing, which is generally performed in the digital coherent method, such as polarization separation and polarization mode dispersion compensation, to a reception signal sent from the band restoration filter 43 of the static linear equalizer 42. The adaptive equalizer 44 sends the reception signal to which the adaptive equalization processing has been applied to the discriminator 45.

The discriminator 45 discriminates a digital bit sequence represented by 1s and 0s from a reception signal input from the adaptive equalizer 44 and outputs the bit sequence signal.

The reception coefficient computation unit 46 computes a filter characteristic inverse to a band narrowing filter characteristic on the transmission side as a filter coefficient, based on the band narrowing parameter on the transmission side received from the communication control device 300. The reception coefficient computation unit 46 computes the filter coefficient inverse to the band narrowing filter characteristic on the transmission side, based on an MMSE criterion. Information of the band narrowing filter that is used when a band is limited on the transmission side is shared with a corresponding optical transmitter 30 in advance. The reception coefficient computation unit 46 of the present example embodiment is equivalent to the reception coefficient computation means 24 of the first example embodiment.

The demultiplexer 52 separates a multiplexed signal input from the optical fiber transmission line 401 into respective subcarriers, that is, optical signals of the respective channels, and sends the subcarriers to the optical receivers 40 corresponding to the respective channels. The demultiplexer 52 is, for example, constituted by a wavelength selective switch (WSS) or a variable optical filter. In a case of a configuration in which a transmitted wavelength is required to be selected, the demultiplexer 52 sets the transmitted wavelength, based on the wavelength-division-multiplexing spacing parameter received from the communication control device 300 via the communication line 402 and selects signals corresponding to the respective channels. The demultiplexer 52 of the present example embodiment is equivalent to the separation means 21 of the first example embodiment.

Figure 7:
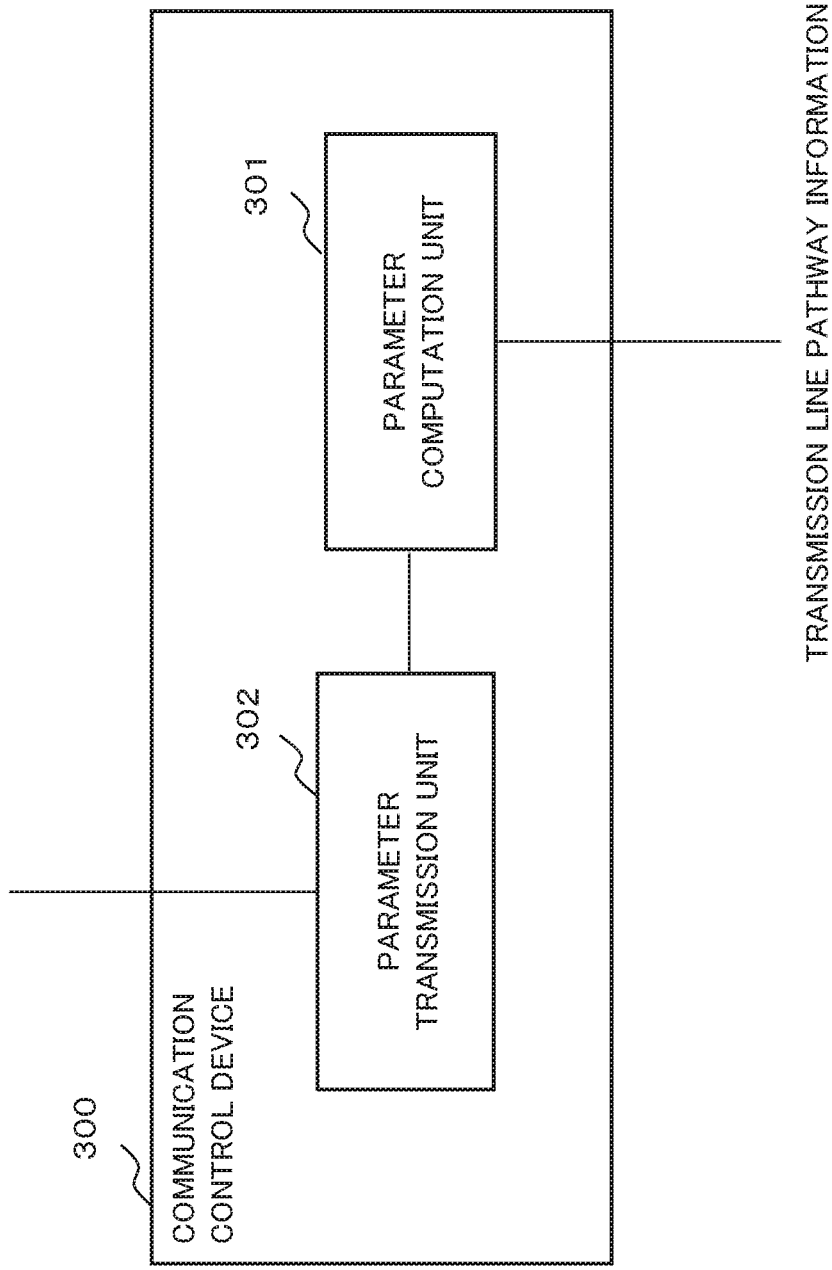
FIG. 7 is a diagram illustrating a configuration of a communication control device of the second example embodiment according to the present invention.

A configuration of the communication control device 300 will be described. FIG. 7 is a diagram illustrating an outline of a configuration of the communication control device 300 of the present example embodiment. The communication control device 300 of the present example embodiment includes a parameter computation unit 301 and a parameter transmission unit 302.

The parameter computation unit 301 computes the band narrowing parameter and the wavelength-division-multiplexing spacing parameter, based on transmission line pathway information input by an administrator or the like. The transmission line pathway information is constituted by information indicating what pathways constitute the optical fiber transmission line 401 between the transmission device 100 and the reception device 200 and information of transmission characteristics when optical signals are transmitted through the respective pathways. The band narrowing parameter is, for example, set as a band narrowing factor that indicates a ratio by which a band is narrowed with a bandwidth matching the baud rate as a reference. The wavelength-division-multiplexing spacing parameter is information that indicates wavelengths corresponding to subcarriers and a wavelength spacing between the wavelengths when the subcarriers are wavelength-division-multiplexed. The parameter computation unit 301 computes wavelengths, a wavelength spacing, and a band narrowing factor to be assigned to the optical transmitters 30 and the optical receivers 40, based on the transmission line pathway information and characteristics of the transmission line in such a way that frequency usage efficiency is maximized for a currently-selected transmission pathway. The parameter computation unit 301 sends information of a wavelength, a wavelength spacing, and a band narrowing factor for each subcarrier, that is, each of optical signals of the respective channels, to the parameter transmission unit 302.

The parameter transmission unit 302 sends the band narrowing parameter and the wavelength-division-multiplexing spacing parameter, which the parameter computation unit 301 has computed, to the transmission device 100 and the reception device 200 via the communication line 402.

The optical fiber transmission line 401 is constituted by optical fibers, optical amplifiers, and the like and transmits wavelength-division-multiplexed optical signals.

The communication line 402 is a communication line that connects the communication control device 300 to the transmission device 100 and the reception device 200.

Although, in FIG. 4, a configuration in which the optical transmitters 30 and the optical receivers 40 are provided within the single transmission device 100 and the single reception device 200, respectively, is illustrated, the optical transmitters 30 and the optical receivers 40 may be provided to a plurality of transmission devices and a plurality of reception devices in a divided manner. In a case of such a configuration, multiplexers and demultiplexers are arranged in such a way that multiplexing and demultiplexing of optical signals of the respective channels can be done. The optical fiber transmission line 401 may be constituted by a plurality of pathways and configured in such a way that any of the transmission pathways is selected.

Figure 8:
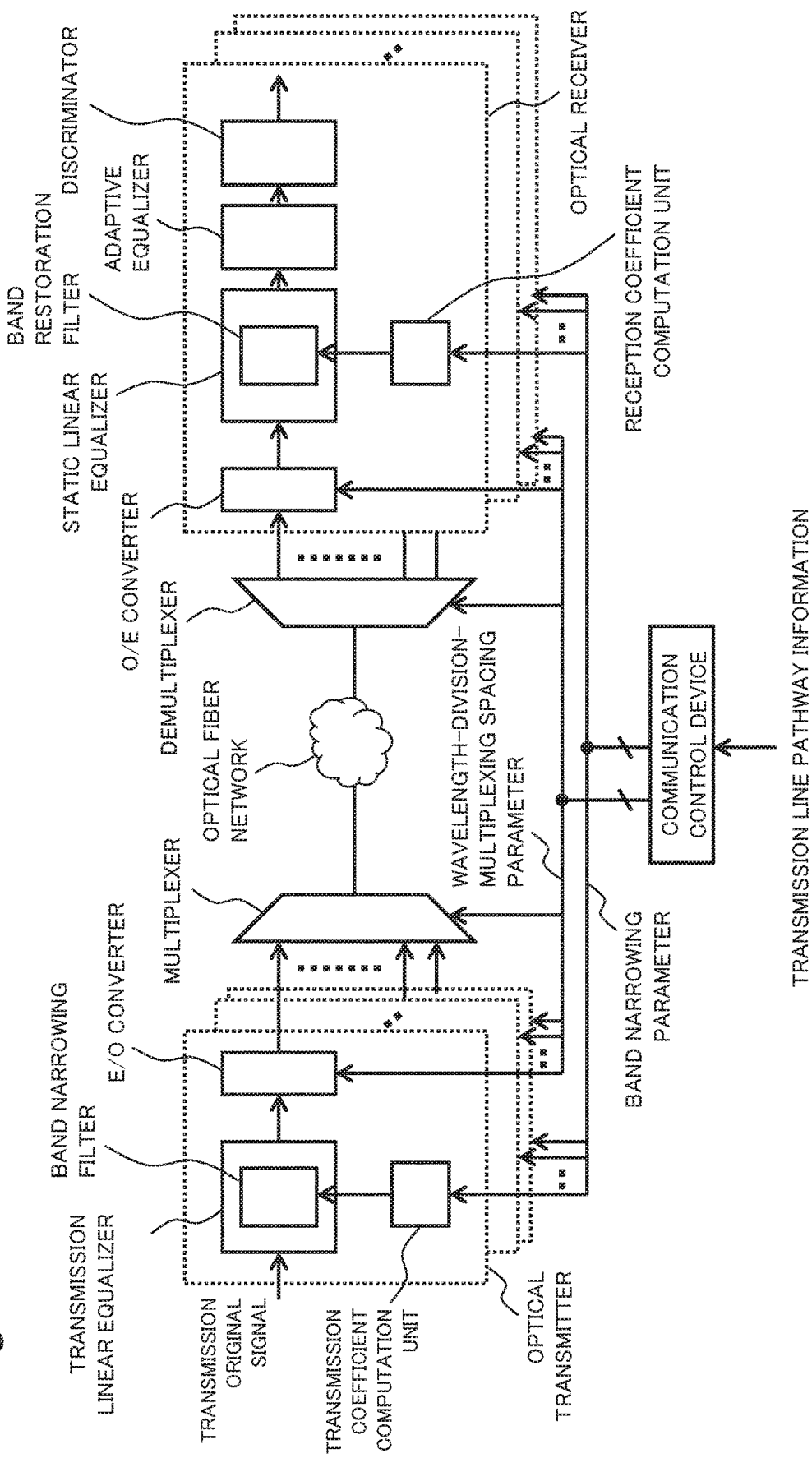
FIG. 8 is a diagram schematically illustrating a configuration of and data flows in the second example embodiment according to the present invention.

FIG. 8 is a diagram schematically illustrating a configuration of an optical communication system of and data flows of respective parameters in the present example embodiment. In FIG. 8, the electrical/optical converter 33 is illustrated as an E/O converter. In FIG. 8, the optical/electrical converter 41 is illustrated as an O/E converter. In FIG. 8, the optical fiber transmission line 401 is illustrated as an optical fiber network.

As illustrated in FIG. 8, in the optical communication system of the present example embodiment, a band narrowing parameter from a communication control device is sent to a transmission coefficient computation unit of each optical transmitter and a reception coefficient computation unit of each optical receiver. A wavelength-division-multiplexing spacing parameter is sent from the communication control device to a multiplexer and the E/O converter of each optical transmitter and a demultiplexer and the O/E converter of each optical receiver. Transmission original signals input to the respective optical transmitters are subjected to band narrowing filter processing that narrows bandwidth to less than or equal to a baud rate by transmission linear equalizers, multiplexed at wavelength spacings less than or equal to the baud rate by the multiplexer, and transmitted. A multiplexed signal transmitted through the optical fiber network is demultiplexed into reception signals by the demultiplexer, the reception signals are input to the respective receivers, and restoration of bandwidth of the reception signals is performed by static linear equalizers.

Operation of the optical communication system of the present example embodiment will be described. First, transmission line pathway information is input to the communication control device 300 by an administrator or the like. The transmission line pathway information is constituted by information of pathways in the optical fiber transmission line 401, information of combinations of the optical transmitter 30 and the optical receiver 40 assigned to the respective channels, and the like. The transmission line pathway information is also constituted by information on transmission characteristics when optical signals are transmitted through the respective pathways in the optical fiber transmission line 401.

When the transmission line pathway information is input, the parameter computation unit 301 of the communication control device 300 computes a band narrowing parameter and a wavelength-division-multiplexing spacing parameter, based on the transmission line pathway information. The parameter computation unit 301 computes the band narrowing parameter and the wavelength-division-multiplexing spacing parameter in such a way as to, while maintaining acceptable transmission characteristics, maximize frequency usage efficiency. The band narrowing parameter is a parameter that indicates a degree of band narrowing when band narrowing is performed in the band narrowing filters 32 of the optical transmitters 30 as a band narrowing factor. In the present example embodiment, the band narrowing factor is set as a ratio of a bandwidth after band narrowing to a bandwidth matching the baud rate.

In the optical communication system of the present example embodiment, the parameter computation unit 301 of the communication control device 300 computes the band narrowing parameter and the wavelength-division-multiplexing spacing parameter, based on the transmission line pathway information and thereby controls the band narrowing factor and the wavelength-division-multiplexing spacing. In the present example embodiment, an acceptable Q-value deterioration margin is computed from transmission characteristics measured in advance. The parameter computation unit 301 computes the band narrowing factor and the wavelength-division-multiplexing spacing, based on the acceptable Q-value deterioration margin in such a way that wavelength division multiplexing in the highest density within a range allowing error correction is performed. Regarding data used when the acceptable Q-value deterioration margin is computed from the transmission line pathway information, characteristics of all the transmission pathways may be measured in advance and stored in a look-up table or the like or corrected by performing measurement at the time of initial connection when a pathway is established.

Figure 9:
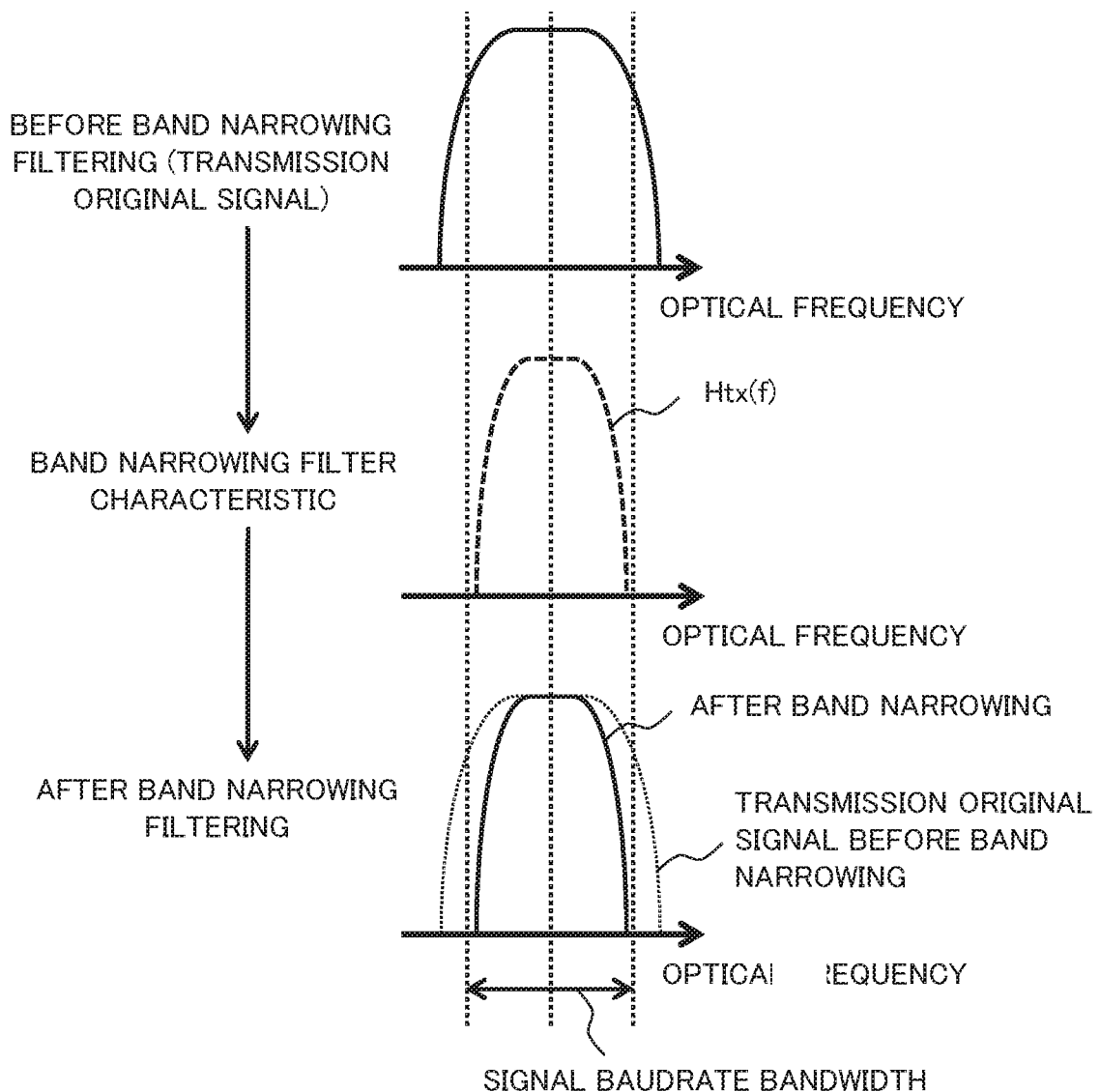
FIG. 9 is a diagram illustrating images of signal spectra of a transmission signal in the second example embodiment according to the present invention.

The band narrowing filter and the band narrowing parameter will be described. FIG. 9 illustrates images of spectral shapes when each band narrowing filter 32 shapes a signal spectrum. The top spectrum in FIG. 9 illustrates a spectral shape of a transmission original signal. The middle spectrum in FIG. 9 illustrates a filter characteristic of a band narrowing filter Htx(f). The bottom spectrum in FIG. 9 illustrates a shape of a signal spectrum after filter processing is applied by the band narrowing filter 32.

In the super-Nyquist method, further application of a band narrowing filter to a transmission original signal conforming to a Nyquist method generates a signal for transmission that is limited to a bandwidth less than or equal to the baud rate. In the top spectrum in FIG. 9, although the spectral bandwidth of the transmission original signal is limited to a vicinity of the baud rate, signal components therein spread slightly wider than the baud rate. Although, in the case of the general Nyquist transmission method, signals having spectral shapes as illustrated in the top spectrum in FIG. 9 are wavelength-division-multiplexed, wavelength-division-multiplexing at spacings less than or equal to the baud rate causes characteristics of the signals to severely deteriorate due to crosstalk with adjacent channels.

On the other hand, in the super-Nyquist method used in the present example embodiment, application of processing by the band narrowing filter Htx(f) illustrated in the middle spectrum in FIG. 9 to the transmission original signal causes the signal spectral bandwidth to be narrowed to less than or equal to the baud rate. Multiplexing of signals to which the processing by the band narrowing filter Htx(f) is applied and that have signal spectral bandwidth illustrated in the bottom spectrum in FIG. 9 enables wavelength division multiplexing of the signals at spacings less than or equal to the baud rate without causing characteristic deterioration due to crosstalk. Although there is a possibility that application of the processing by the band narrowing filter causes inter-symbol interference and thereby causes signal quality deterioration, compensation on the reception side can suppress influence from the inter-symbol interference. Thus, use of the super-Nyquist method, in which transmission of a multiplexed signal multiplexed at wavelength-division-multiplexing spacings less than or equal to the baud rate through band narrowing is performed, enables frequency usage efficiency to be improved.

Figure 10:
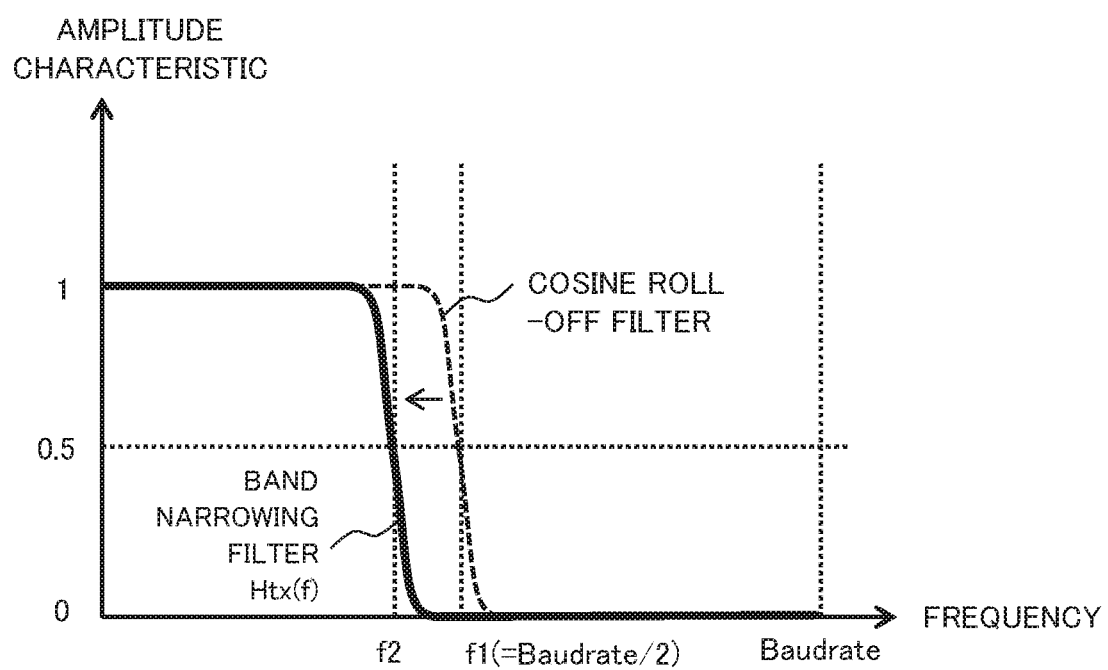
FIG. 10 is a diagram illustrating an example of a band narrowing filter characteristic in the second example embodiment according to the present invention.

FIG. 10 illustrates an example of the band narrowing filter Htx(f). FIG. 10 illustrates a filter characteristic for a baseband signal. That is, FIG. 10 illustrates, of the filter characteristic for an optical spectrum illustrated in the middle spectrum in FIG. 9, only a half on one side when the carrier frequency is assumed to be 0. The band narrowing filter Htx(f) illustrated in FIG. 10 has a characteristic that is obtained by shifting the roll-off characteristic of a cosine roll-off filter used as a Nyquist filter to the low frequency side as it is. In a regular cosine roll-off filter, the amplitude characteristic becomes 0.5, that is, a half, at a frequency f1 of a half of the baud rate. Meanwhile, in the band narrowing filter Htx(f) in FIG. 10, a frequency f2 at which the amplitude characteristic becomes 0.5 is parallel-shifted to the low frequency side. When a ratio f2/f1 is assumed to be a band narrowing parameter, the smaller the band narrowing parameter is, the narrower the signal spectral bandwidth becomes. For example, when the band narrowing parameter is 0.9, the bandwidth is narrowed by 10% compared with the regular Nyquist method.

Although, in FIG. 10, an example of a band narrowing filter based on the cosine roll-off characteristics is illustrated, any other band narrowing filter may be used as long as the filter is based on a characteristic that narrows a signal band.

Figure 11:
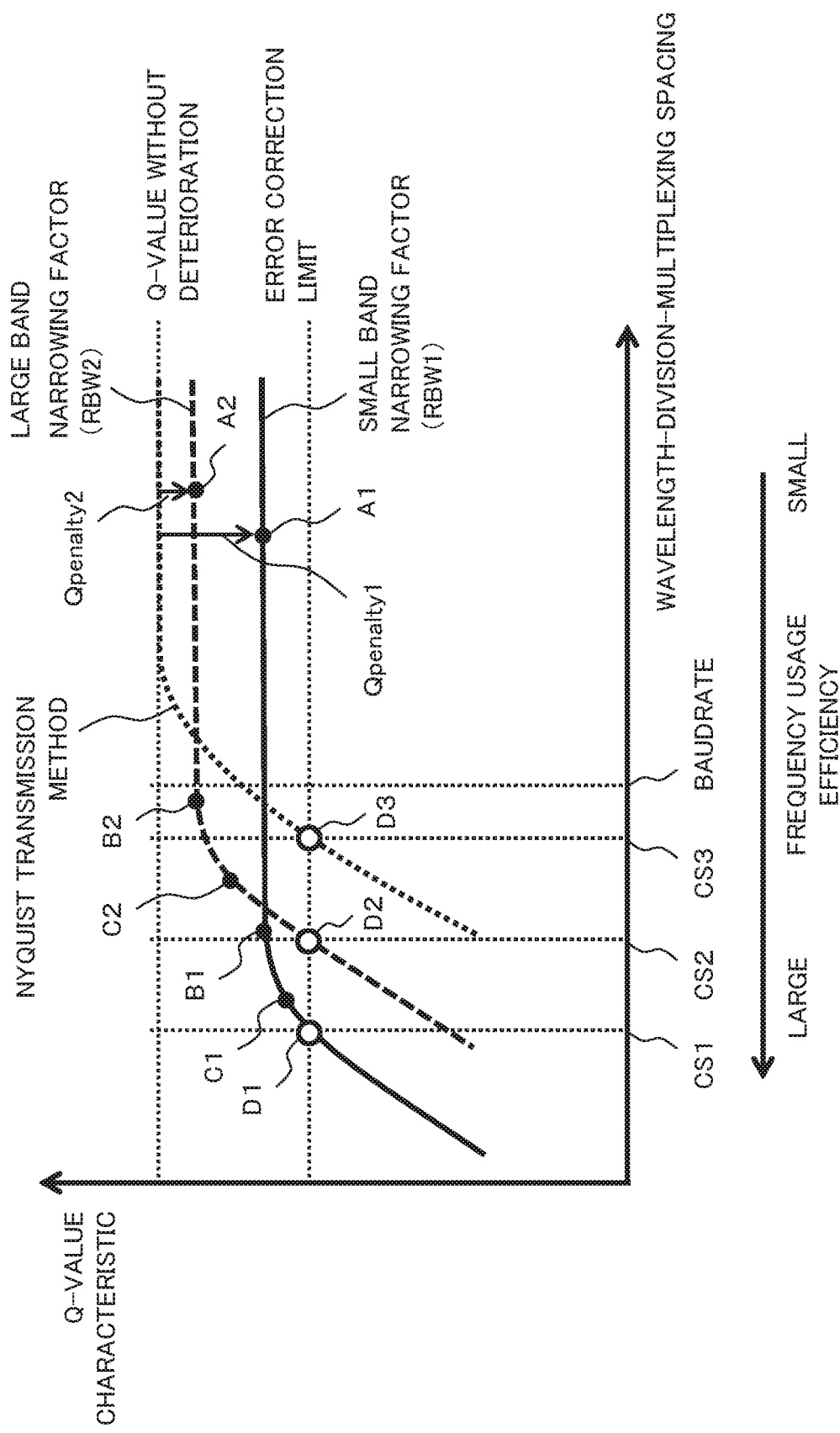
FIG. 11 is a diagram illustrating a relationship between a wavelength-division-multiplexing spacing and characteristics of a transmission line in the second example embodiment according to the present invention.

Next, a relationship between the wavelength-division-multiplexing spacing and transmission characteristics in the optical communication system performing the band narrowing filter processing that narrows bandwidth to less than or equal to a baud rate will be described with reference to FIG. 11. FIG. 11 is a diagram illustrating an example of relationships between the wavelength-division-multiplexing spacing and Q-value characteristics indicating transmission characteristics with respect to respective band narrowing factors.

Figure 12:
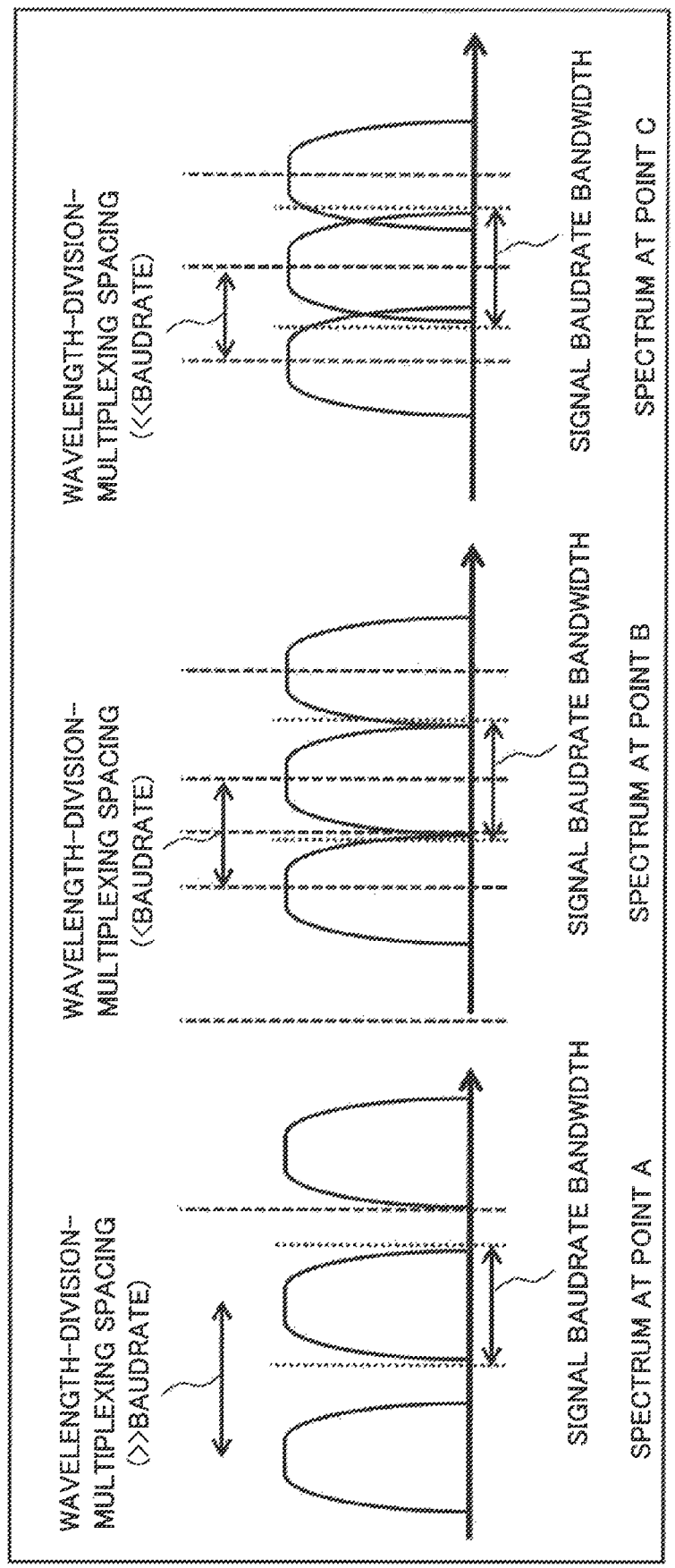
FIG. 12 is a diagram schematically illustrating spectra of multiplexed signals in the second example embodiment according to the present invention.

FIG. 11 illustrates relationships between the wavelength-division-multiplexing spacing and the Q-value characteristics when two different band narrowing factors are set to the band narrowing filter. In FIG. 11, a case where a smaller band narrowing factor is set and a case where a larger band narrowing factor is set are indicated by reference symbols RBW1 and RBW2, respectively. RBW1 and RBW2 satisfy RBW1<RBW2<1. That is, the smaller the band narrowing factor is, the narrower the bandwidth becomes. FIG. 11 also illustrates a relationship between the wavelength-division-multiplexing spacing and the Q-value characteristic when the Nyquist transmission method is used, for comparison. FIG. 12 illustrates spectral images of wavelength division multiplexing at three points A1, B1, and C1 in FIG. 11 when the band narrowing filter processing is performed with the band narrowing factor RBW1.

A wavelength spectral image in the case of the band narrowing factor RBW1 illustrated by a solid line in FIG. 11, that is, when the bandwidth is narrow, will be described. A leftmost spectrum at a point A in FIG. 12 illustrates a spectral image of wavelength division multiplexing at the point A1 in FIG. 11 at which the wavelength-division-multiplexing spacing is sufficiently wide. Since, in the spectrum at the point A in FIG. 12, there is no overlap between the spectra of adjacent channels, no characteristic deterioration due to crosstalk occurs. However, since the band narrowing factor is small and excessive band narrowing to less than or equal to a baud rate bandwidth is performed, the waveform cannot be completely restored on the reception side and inter-symbol interference (ISI) is therefore left unremoved. Thus, characteristic deterioration in the Q-value has occurred compared with the Nyquist method. In FIG. 11, characteristic deterioration in the Q-value at the point A compared with the Nyquist method is indicated by Qpenalty1.

A middle spectrum at a point B in FIG. 12 illustrates a spectral image of wavelength division multiplexing at the point B1 in FIG. 11 at which the band narrowing is performed in such a way as to further narrow the wavelength-division-multiplexing spacing than that at the point A1. The middle spectrum at the point B in FIG. 12 has no gap between the channels and indicates a wavelength-division-multiplexed signal arranged in the highest density within a range not to generate crosstalk. That is, in a section from A1 to B1 in FIG. 11, the Q-value characteristic is kept at the same value even when the wavelength-division-multiplexing spacing is narrowed.

A rightmost spectrum at a point C in FIG. 12 illustrates a spectral image of wavelength division multiplexing at the point C1 in FIG. 11 at which the wavelength-division-multiplexing spacing is further narrowed. In the rightmost spectrum at the point C in FIG. 12, crosstalk has occurred between adjacent channels and deterioration in the Q-value characteristic has occurred. That is, deterioration in the Q-value characteristic due to crosstalk occurs on the left side of the point B1 in FIG. 11. Further narrowing the wavelength-division-multiplexing spacing causes the Q-value characteristic to decrease to an error correction limit at a point D1 in FIG. 11.

As described above, under the condition of RBW1, it is possible to, while allowing Q-value characteristic deterioration Qpenalty1 due to inter-symbol interference in a region of the wavelength-division-multiplexing spacing in which no crosstalk occurs, achieve high density multiplexing by narrowing the spacing to a wavelength-division-multiplexing spacing indicated by CS1 at the point D1 in FIG. 11. A region on the right side of the point B1 in FIG. 11 applies to the region of the wavelength-division-multiplexing spacing in which no crosstalk occurs.

A wavelength spectral image in the case of the band narrowing factor RBW2 in FIG. 11, that is, when the band narrowing factor is large, will be described. At a point A2 in FIG. 11, deterioration indicated by Qpenalty2 occurs in the Q-value characteristic compared with that in the Nyquist method. However, since a degree of band narrowing is less than that in the case of the band narrowing factor RBW1, ISI components left unremoved are also small. Thus, the amount Qpenalty2 of characteristic deterioration is reduced to less than Qpenalty1.

As the wavelength-division-multiplexing spacing is decreased, the Q-value characteristic is maintained until reaching a limit point B2 of a section where there is no crosstalk deterioration. At a point C2 at which the wavelength-division-multiplexing spacing is further narrowed, deterioration due to crosstalk occurs. When the wavelength-division-multiplexing spacing is further narrowed to a point D2 that is an error correction limit, influence of crosstalk occurs earlier than the case of the band narrowing factor RBW1 because the degree of band narrowing is low. That is, a minimum limit value CS2 of the wavelength-division-multiplexing spacing in the case of the band narrowing factor RBW2 is larger than a minimum limit value CS1 in the case of the band narrowing factor RBW1.

In a method, like the Nyquist transmission method, in which band narrowing is performed without allowing characteristic deterioration due to ISI, excellent Q-value characteristics are achieved because, where the wavelength-division-multiplexing spacing is sufficiently wide, not only deterioration due to crosstalk but also waveform distortion due to ISI does not occur. However, since the Nyquist transmission method has a slightly wider spectral width than the baud rate bandwidth, Q-value characteristic deterioration due to crosstalk notably appears when the wavelength-division-multiplexing spacing is narrowed. Thus, a wavelength-division-multiplexing spacing CS3 at an error correction limit D3 is the largest compared with the cases where the band narrowing according to the present example embodiment is performed. That is, the frequency usage efficiency is the smallest compared with the other two conditions in which the band narrowing according to the present example embodiment is performed.

The band narrowing factor and the amount of Q-value characteristic deterioration due to ISI left unremoved are in a trade-off relationship, and the minimum limit value of the wavelength-division-multiplexing spacing varies according to the acceptable amount of Q-value characteristic deterioration. However, acceptable Q-value characteristic deterioration differs depending on conditions of the transmission line. For example, under the condition of long transmission distance, margin for acceptable Q-value deterioration becomes small because a reception OSNR deteriorates and the whole Q-value characteristic deteriorates. In such a case, the frequency usage efficiency cannot be increased even when excessive band narrowing is performed. On the other hand, under the condition of short transmission distance, since the reception OSNR is high and a sufficient margin for the Q-value can be secured, the wavelength-division-multiplexing spacing can be narrowed with priority given to the frequency usage efficiency even if excessive band narrowing is performed and Q-value deterioration due to ISI is allowed. That is, the band narrowing factor and the Q-value deterioration due to ISI are in a trade-off relationship, and the acceptable amount of Q-value deterioration differs depending on transmission conditions. Therefore, selection of an appropriate band narrowing factor according to transmission line conditions by the parameter computation unit 301 of the communication control device 300 enables the wavelength division multiplexing in the highest density to be performed for various conditions of the transmission line.

When having computed the band narrowing parameter and the wavelength-division-multiplexing spacing parameter, based on the transmission line pathway information, the parameter computation unit 301 of the communication control device 300 sends the band narrowing parameter and the wavelength-division-multiplexing spacing parameter to the parameter transmission unit 302.

When having received data of the band narrowing parameter and the wavelength-division-multiplexing spacing parameter, the parameter transmission unit 302 sends the received data to the transmission device 100 and the reception device 200 via the communication line 402.

The wavelength-division-multiplexing spacing parameter input to the transmission device 100 is input to the electrical/optical converter 33 of each optical transmitter 30 and the multiplexer 51. When having received the wavelength-division-multiplexing spacing parameter, the electrical/optical converters 33 and the multiplexer 51 operate at wavelengths and a wavelength spacing based on the wavelength-division-multiplexing spacing parameter.

The wavelength-division-multiplexing spacing parameter input to the reception device 200 is input to the optical/electrical converter 41 of each optical receiver 40 and the demultiplexer 52. When having received the wavelength-division-multiplexing spacing parameter, the optical/electrical converters 41 of each optical receiver 40 and the demultiplexer 52 operate at wavelengths and a wavelength spacing based on the wavelength-division-multiplexing spacing parameter.

The band narrowing parameter input to the transmission device 100 is input to the transmission coefficient computation unit 34 of each optical transmitter 30. The transmission coefficient computation unit 34 computes a filter coefficient of the band narrowing filter, based on the band narrowing parameter. When having computed a filter coefficient of the band narrowing filter, the transmission coefficient computation unit 34 sends the computed filter coefficient to the band narrowing filter 32.

The band narrowing parameter input to the reception device 200 is input to the reception coefficient computation unit 46 of each optical receiver 40. The reception coefficient computation unit 46 computes a filter coefficient of the band restoration filter, based on the band narrowing parameter. The reception coefficient computation unit 46 computes the filter coefficient of the band restoration filter in such a way that the band restoration filter has a filter characteristic inverse to that in the band narrowing filter processing performed on the transmission side. When having computed a filter coefficient of the band restoration filter, the reception coefficient computation unit 46 sends the computed filter coefficient to the band restoration filter 43.

When a signal to be transmitted via the optical fiber transmission line 401 has been input to one of the optical transmitters 30 as a transmission original signal, the transmission original signal is sent to the transmission linear equalizer 31. When the transmission original signal has been input to the transmission linear equalizer 31, the band narrowing filter 32 applies the band narrowing filter processing to the transmission original signal. The band narrowing filter 32 applies filter processing to the transmission original signal, based on the filter coefficient received from the transmission coefficient computation unit 34.

The band narrowing filter 32 sends the signal to which the filter processing has been applied to the electrical/optical converter 33. When having received the signal, the electrical/optical converter 33 generates an optical signal, based on the received signal. The electrical/optical converter 33 generates an optical signal having a wavelength based on the wavelength-division-multiplexing spacing parameter. The electrical/optical converter 33 sends the generated optical signal to the multiplexer 51.

When optical signals have been input from the respective optical transmitters 30 as subcarriers of the respective channels, the multiplexer 51 wavelength-division-multiplexes the optical signals, that is, subcarriers, from the respective optical transmitters 30. The multiplexer 51 wavelength-division-multiplexes the subcarriers sent from the respective optical transmitters 30 into a multiplexed signal at wavelength spacings that are based on the wavelength-division-multiplexing spacing parameter and that are less than or equal to the baud rate and transmits the multiplexed signal to the optical fiber transmission line 401. The multiplexed signal transmitted from the multiplexer 51 of the transmission device 100 is transmitted through the optical fiber transmission line 401 and thereby sent to the reception device 200.

The multiplexed signal transmitted through the optical fiber transmission line 401 is input to the demultiplexer 52 of the reception device 200. The demultiplexer 52 separates the input multiplexed signal into optical signals corresponding to the respective channels and sends the optical signals to the corresponding optical receivers 40. The optical signals sent to the corresponding optical receivers 40 are input to the optical/electrical converters 41.

Each optical/electrical converter 41 converts the input optical signal, that is, a reception signal, to an electrical signal and sends the electrical signal to the static linear equalizer 42 as a digital signal.

When the reception signal has been input, the static linear equalizer 42 applies filter processing to the reception signal, using the band restoration filter 43 in addition to wavelength dispersion compensation and thereby restores the band of the reception signal on which the band narrowing was performed on the transmission side. The band restoration filter has a characteristic inverse to that of the band narrowing filter on the transmission side. The filter coefficient of the band restoration filter is determined through computation processing by the reception coefficient computation unit 46 and input to the band restoration filter 43 from the reception coefficient computation unit 46.

Figure 13:
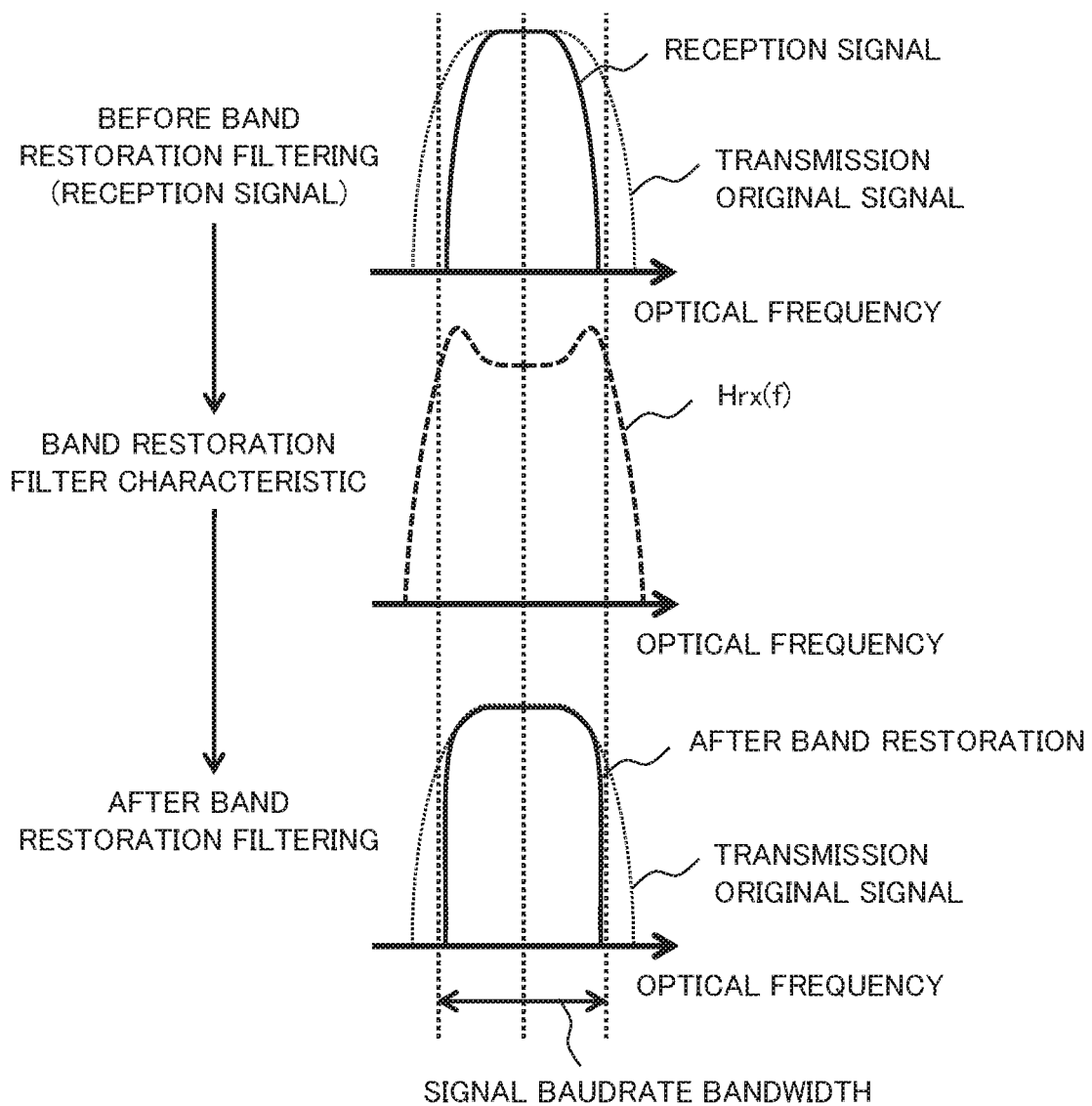
FIG. 13 is a diagram illustrating images of signal spectra of a reception signal in the second example embodiment according to the present invention.

The band restoration filter processing will be described. FIG. 13 illustrates images of spectral shapes when a reception signal is processed. The top spectrum in FIG. 13 illustrates a spectral shape of a reception signal. A spectral shape of a transmission original signal is also illustrated by a dotted line for comparison. The middle spectrum in FIG. 13 illustrates a filter shape of a band restoration filter Hrx(f). The bottom spectrum in FIG. 13 illustrates a spectral shape of a signal after band restoration. As illustrated in the top spectrum in FIG. 13, since having been subjected to the band narrowing filter on the transmission side, the reception signal before band restoration has a spectral shape in which, among signal principal components contained within the baud rate bandwidth, in particular, high frequency components are substantially attenuated, causing the waveform thereof to be substantially distorted.

If a signal having a substantial waveform distortion as illustrated in the top spectrum in FIG. 13 is input to the adaptive equalizer at the succeeding stage, there is a possibility that the convergence of the adaptive equalization algorithm is severely impaired and the stability thereof is lost. In some cases, there is a possibility that the adaptive equalization algorithm diverges, instead of converging, caused by the distorted waveform and loss of synchronization occurs. Such a situation may become a fatal problem for the optical communication system.

In the optical communication system of the present example embodiment, performing the band restoration filter processing having characteristics inverse to those of the band narrowing filter processing, performed on the transmission side, causes high frequency components to be lifted up, as illustrated in the bottom spectrum in FIG. 13. Thus, it is possible to bring a signal spectrum closer to the spectrum of a transmission original signal by the band restoration filter processing. Since the lifting up of high frequency components enables waveform distortion to be suppressed, the convergence of the adaptive equalizer at the succeeding stage is improved. Therefore, in the optical communication system of the present example embodiment, it is possible to maintain a stable communication state without loss of synchronization.

As illustrated in the bottom spectrum in FIG. 13, since it is impossible to completely restore a signal a portion of which was once lost on the transmission side to the original signal, a small amount of waveform distortion is left unremoved and characteristic deterioration occurs in the signal after the band restoration filter processing. However, when the amount of characteristic deterioration is less than an error correction limit, it is possible to continue communication normally. Therefore, in the optical communication system of the present example embodiment, it becomes possible to, while improving frequency usage efficiency, continue normal communication even without using a maximum likelihood sequence estimation (MLSE) equalizer, which has a large circuit size and consumes a lot of power.

When having applied the band restoration filter processing to the reception signal, based on the filter coefficient received from the reception coefficient computation unit 46, the band restoration filter 43 sends the reception signal that has been subjected to the band restoration filter processing to the adaptive equalizer 44. When the signal that has been subjected to the band restoration filter processing has been input, the adaptive equalizer 44 performs adaptive equalization processing on the input signal and sends the processed signal to the discriminator 45. When having received the signal from the adaptive equalizer 44, the discriminator 45 performs discrimination on the reception signal as a digital bit sequence and outputs a signal based on the discriminated bit sequence. The optical/electrical converter 41, the static linear equalizer 42, the band restoration filter 43, the adaptive equalizer 44, and the discriminator 45 repeat the above-described operations every time a reception signal is input.

Figure 14:
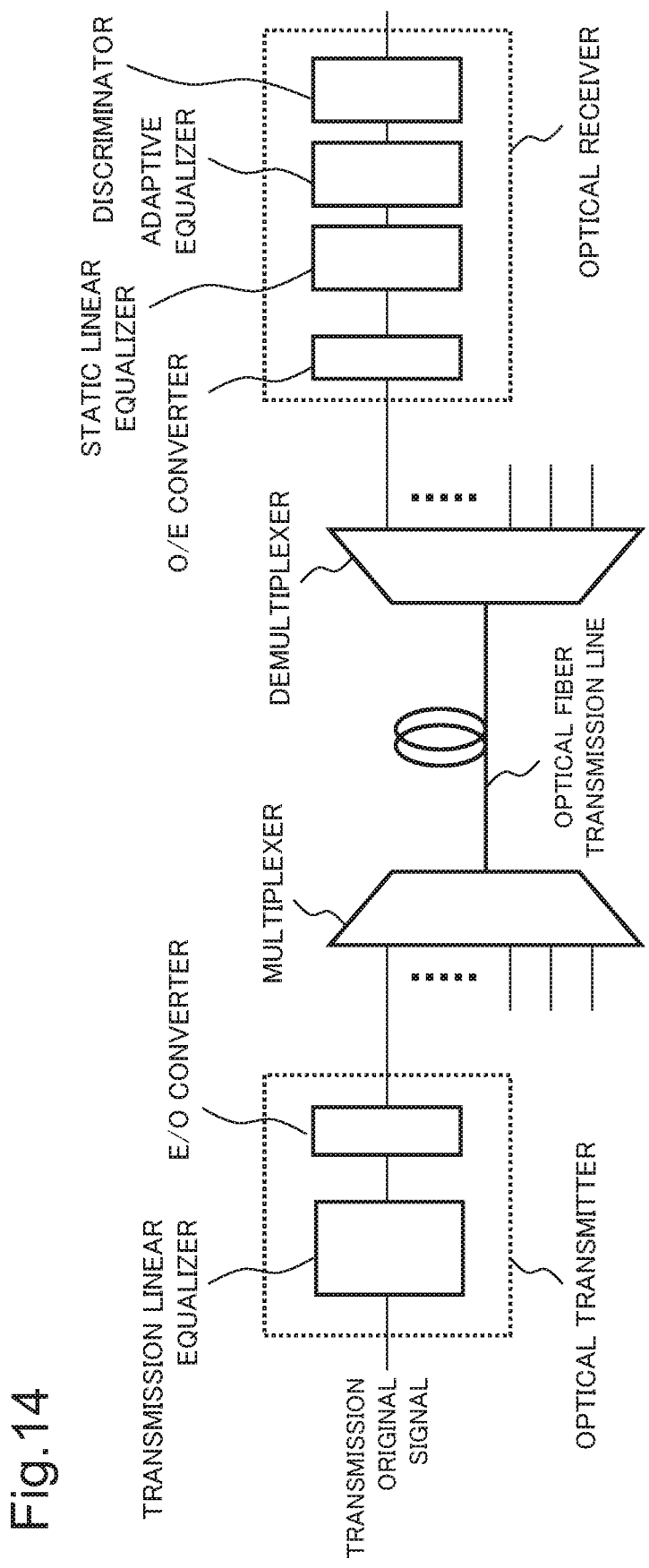
FIG. 14 is a diagram illustrating an example of a configuration of an optical communication system having a configuration for comparison with the present invention.
Figure 15A:
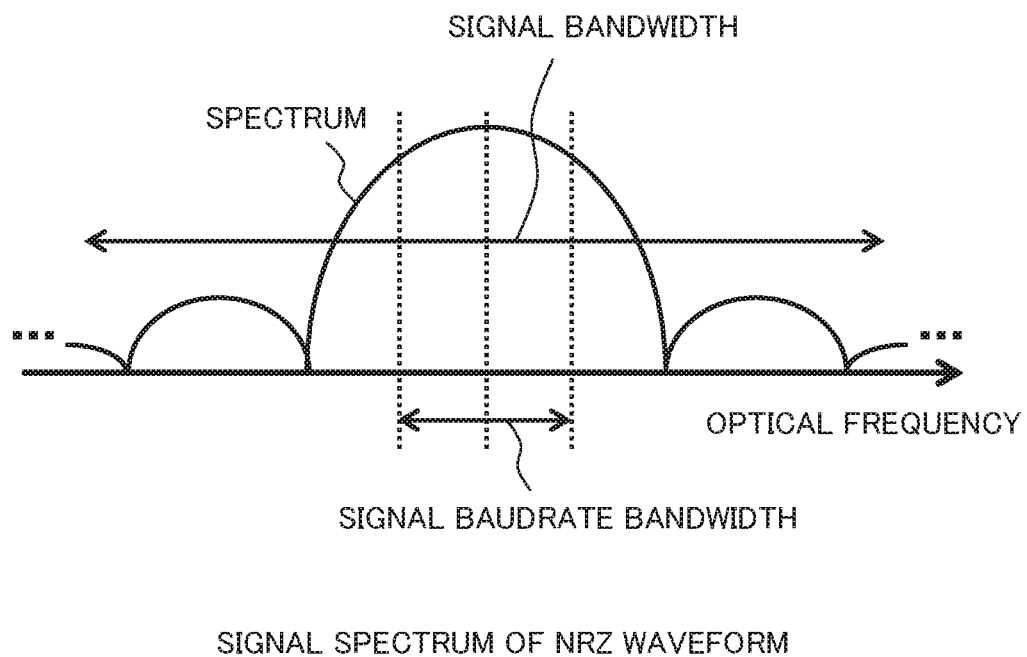
FIG. 15A is a diagram illustrating an example of a signal spectrum of an NRZ waveform.
Figure 15B:
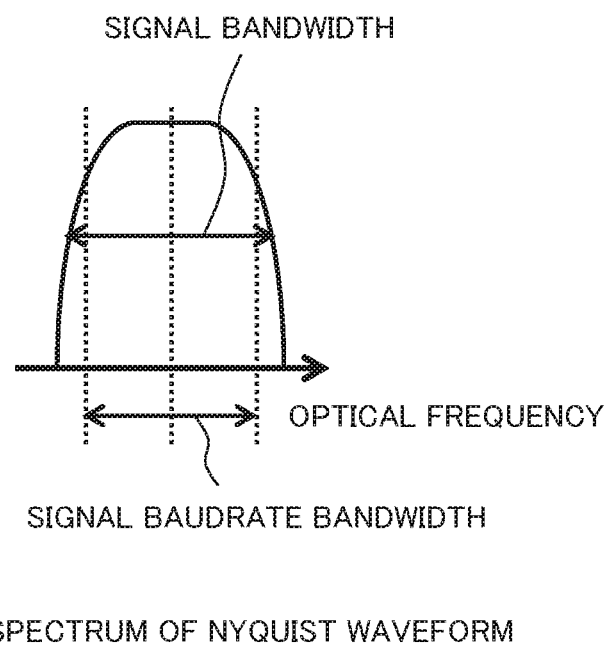
FIG. 15B is a diagram illustrating an example of a signal spectrum of a Nyquist waveform.
Figure 15C:
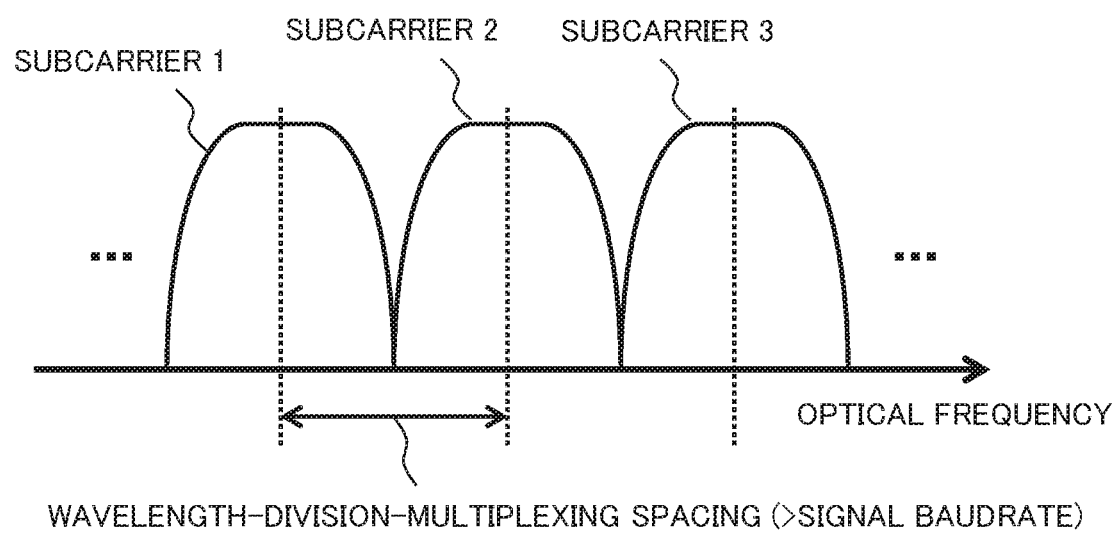
FIG. 15C is a diagram illustrating an image of wavelength division multiplexing of a Nyquist method.

FIG. 14 is a diagram illustrating a configuration of an optical communication system using the Nyquist transmission method as an example for comparison with the optical communication system of the present example embodiment. An E/O converter in FIG. 14 is equivalent to the electrical/optical converter of the present example embodiment. An O/E converter in FIG. 10 is equivalent to the optical/electrical converter of the present example embodiment. FIG. 15A illustrates a signal spectrum in a non return to zero (NRZ) method. FIG. 15B illustrates a signal spectrum in the Nyquist transmission method. FIG. 15C illustrates a spectral image of wavelength-division-multiplexed subcarriers in the Nyquist transmission method.

In the Nyquist transmission method, a transmission linear equalizer on the transmission side and a static linear equalizer on the reception side apply root-Nyquist filters based on cosine roll off filters. The cosine roll off filter is used as a band limiting filter satisfying the Nyquist's first criterion. In the Nyquist transmission method, performing such processing enables a signal band to be narrowed to a vicinity of the baud rate in a state in which there is no ISI. Thus, in the Nyquist transmission method, it becomes possible to substantially narrow the bandwidth compared with a signal spectrum in the NRZ method. As a result, in the Nyquist transmission method, it becomes possible to perform high density wavelength division multiplexing, as illustrated in FIG. 15C.

Since, in FIG. 15C, a case where subcarriers are multiplexed at narrowest wavelength-division-multiplexing spacings that do not cause crosstalk with adjacent subcarrier signals is illustrated, the wavelength-division-multiplexing spacing becomes slightly wider than the signal baud rate. Regarding a cosine roll off filter, when a roll-off factor is brought close to 0 to the extent possible, it becomes possible to bring the signal spectral shape closer to a rectangle, and it thereby becomes possible to achieve wavelength division multiplexing at spacings as close to the baud rate as possible. However, to generate an ideal transmission signal having a roll-off factor of 0 using an actual device, requirements for analog characteristics of transmission front-end devices, such as an optical modulator and its driver circuit constituting the electrical/optical converter, become extremely hard to achieve. The analog characteristics include characteristics such as a frequency response, in-band flatness, and reflection. In addition, bringing the wavelength-division-multiplexing spacings to less than or equal to the baud rate causes the characteristics to substantially deteriorate due to influence of crosstalk.

FIG. 16 is a diagram illustrating an example of a configuration of a regular super-Nyquist transmission method, which performs wavelength division multiplexing at wavelength-division-multiplexing spacings less than or equal to a baud rate without performing band narrowing processing and band restoration processing in accordance with the method of the present example embodiment. In the super-Nyquist transmission method as illustrated in FIG. 16, band narrowing filter processing that narrows signal bandwidth to less than or equal to a baud rate is applied in a transmission linear equalizer, and high-density wavelength-division-multiplexing spacings that are less than or equal to the baud rate are achieved.

Figure 17A:
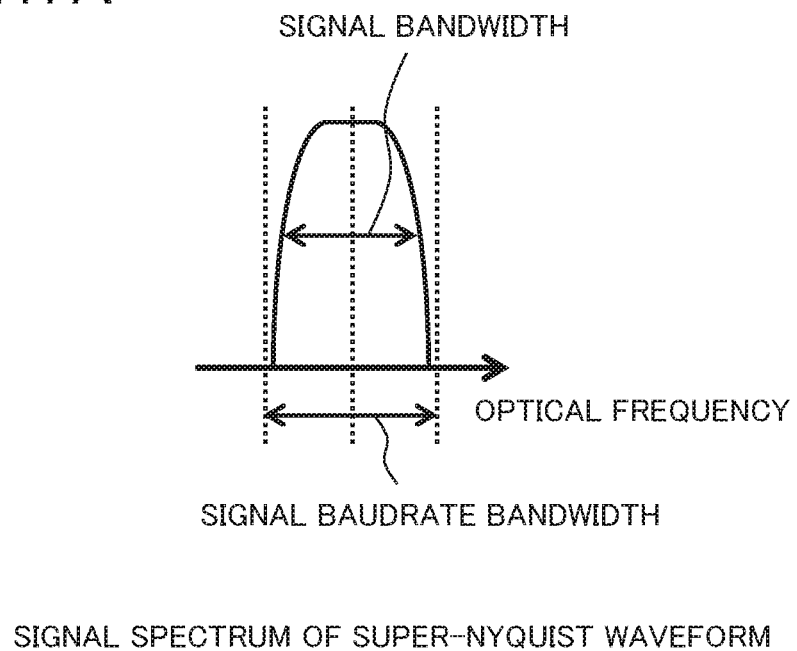
FIG. 17A is a diagram illustrating an example of a signal spectrum of a super-Nyquist waveform.
Figure 17B:
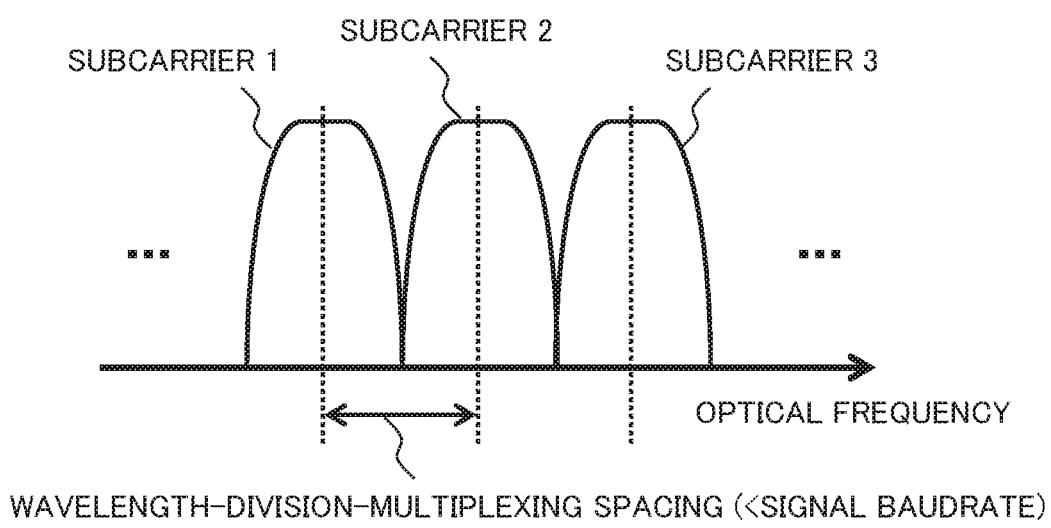
FIG. 17B is a diagram illustrating an image of wavelength division multiplexing of super-Nyquist waveforms.

FIG. 17A illustrates a signal spectrum image in the super-Nyquist method. FIG. 17B illustrates a spectral image of wavelength-division-multiplexed subcarriers in the super-Nyquist method. In the super-Nyquist method, it becomes possible to perform wavelength division multiplexing at spacings less than or equal to a baud rate and thereby becomes possible to improve frequency usage efficiency, as illustrated in FIGS. 17A and 17B. However, in the super-Nyquist method, since the amount of information is reduced by cutting transmission signal bandwidth down to less than or equal to the baud rate, it is difficult to restore a transmission signal by means of regular reception processing. For this reason, as illustrated in FIG. 16, a method of restoring transmission symbols on the reception side, using a maximum likelihood estimation algorithm typified by a maximum likelihood sequence estimation (MLSE) equalizer is sometimes used.

However, there are mainly two major problems in the super-Nyquist transmission method described above. The first problem is stability in waveform equalization. In the optical receiver, two types of waveform equalization processing, that is, a static linear equalizer for compensating for static waveform distortion, such as wavelength dispersion compensation, and an adaptive equalizer for compensating for waveform distortion that temporally varies, including polarization processing, are performed. However, in the super-Nyquist transmission method, signals having bandwidth narrower than the band of transmission original signals are received. Thus, although it is required to restore the original signal on the reception side, the narrower signal bandwidth is made in order to narrow wavelength-division-multiplexing spacings and thereby improve frequency usage efficiency, the larger waveform distortion of a reception signal becomes, which causes convergence of the adaptive equalizer to severely deteriorate. In some cases, there is a possibility that loss of synchronization occurs, and it becomes unable to perform stable communication.

The second problem is that the signal restoration processing using a maximum likelihood estimation algorithm is so complex that increase in circuit size and power consumption occurs. In particular, implementing an MLSE equalizer used at a throughput of more than or equal to 100 Gbps, which is applied in optical communication, as an LSI not only has a high degree of technical difficulty but also is not practical from the viewpoint of circuit size thereof even when the current state-of-the-art process is used.

On the other hand, the optical communication system of the present example embodiment is capable of reducing distortion of a reception signal by applying, on the reception side, the band restoration filter processing that has inverse characteristics to those of the band narrowing filter, which is applied on the transmission side to make the band of transmission original signals less than or equal to the baud rate. Therefore, convergence of the adaptive equalization processing in the adaptive equalizer at the succeeding stage is stabilized and it becomes possible to continue stable communication.

The optical communication system of the present example embodiment applies the band narrowing filter processing to transmission original signals, based on the band narrowing parameter and converts the filtered signals to optical signals corresponding to subcarriers of the respective channels, in the optical transmitters 30. The band narrowing parameter was computed based on transmission characteristics of optical signals in the communication control device 300 and has been transmitted to the optical transmitters 30 and the optical receivers 40. That is, the optical transmitters 30 and the optical receivers 40 share information of the band narrowing parameter computed based on transmission characteristics.

The multiplexer 51 wavelength-division-multiplexes the subcarriers output from the respective optical transmitters 30 into a multiplexed signal at wavelength spacings less than or equal to the baud rate, based on the wavelength-division-multiplexing spacing parameter computed based on the transmission characteristics in the communication control device 300 and outputs the multiplexed signal to the optical fiber transmission line 401. Since the transmission device 10 of the present example embodiment is thus capable of multiplexing and transmitting subcarriers at a bandwidth and a wavelength spacing according to transmission characteristics, it is possible to improve frequency usage efficiency.

In the optical communication system of the present example embodiment, each optical receiver 40 applies filter processing having a filter characteristic inverse to that in the band narrowing filter processing on the transmission side to reception signals, based on the band narrowing parameter shared with the transmission side, which is sent from the communication control device 300. Thus, each optical receiver 40 is capable of restoring a signal spectrum that is closer to the signal spectrum of a transmission original signal before band narrowing. That is, the optical receivers 40 of the present example embodiment are capable of restoring signal spectra that are closer to the signal spectra of transmission original signals from a multiplexed signal into which the transmission original signals are wavelength-division-multiplexed at a bandwidth and a wavelength spacing according to transmission characteristics.

Since the optical receivers 40 of the present example embodiment are capable of restoring signal spectra that are closer to the signal spectra of transmission original signals and thereby suppressing influence from distortion of the signals, it is possible to stably perform processing of reception signals in the adaptive equalizers or the like. Therefore, signals can be restored stably even without using an MLSE equalizer or the like, which causes increase in circuit size and power consumption, and circuit miniaturization and power consumption reduction can thereby be achieved.

As described above, the optical communication system of the present example embodiment is capable of performing subcarrier multiplexed digital coherent transmission, in which a wavelength division multiplexing technology is utilized, without requiring a circuit having a large size and consuming a lot of power like an MLSE equalizer. Since the optical communication system performs narrowing and restoration of the band of a signal, based on characteristics of a transmission line, the optical communication system is capable of performing optimum wavelength division multiplexing for various transmission lines while reducing time required for setting. Therefore, even when an elastic network system in which transmission lines are switched is configured, the communication system of the present example embodiment is capable of improving frequency usage efficiency and thereby expanding transmission capacity per optical fiber. Consequently, the communication system of the present example embodiment enables optimum high-density wavelength division multiplexing according to transmission conditions to be performed and thereby enables frequency usage efficiency to be improved even when switching of pathways of the transmission line is performed.

THIRD EXAMPLE EMBODIMENT

A third example embodiment of the present invention will be described in detail with reference to the drawings. FIG. 18 is a diagram illustrating an outline of a configuration of an optical communication system according to the present example embodiment.

The optical communication system of the present example embodiment includes a transmission device 100, a reception device 500, and a communication control device 310. The transmission device 100 and the reception device 500 are interconnected via an optical fiber transmission line 401. The communication control device 310 is connected to the transmission device 100 and the reception device 500 via a communication line 402.

The optical communication system of the present example embodiment is, as with the second example embodiment, a digital optical communication system that transmits a wavelength-division-multiplexed optical signal from the transmission device 100 to the reception device 500 via the optical fiber transmission line 401. The optical communication system of the present example embodiment, as with the second example embodiment, performs communication, using the digital coherent method and the super-Nyquist transmission method.

In the second example embodiment, a band narrowing parameter is computed in the communication control device, based on characteristics of a transmission line measured in advance. The optical communication system of the present example embodiment is characterized in that, in place of such a configuration, a band narrowing parameter is computed based on a result of measurement of noise characteristics in the optical fiber transmission line 401.

The configurations and functions of the transmission device 100 and the optical fiber transmission line 401 of the present example embodiment are similar to those of the second example embodiment.

The reception device 500 includes a plurality of optical receivers 60 and a demultiplexer 52. The configuration and functions of the demultiplexer 52 of the present example embodiment are similar to those of the demultiplexer 52 of the second example embodiment. The optical receivers 60 are provided in such a way as to correspond to optical transmitters 30.

Figure 19:
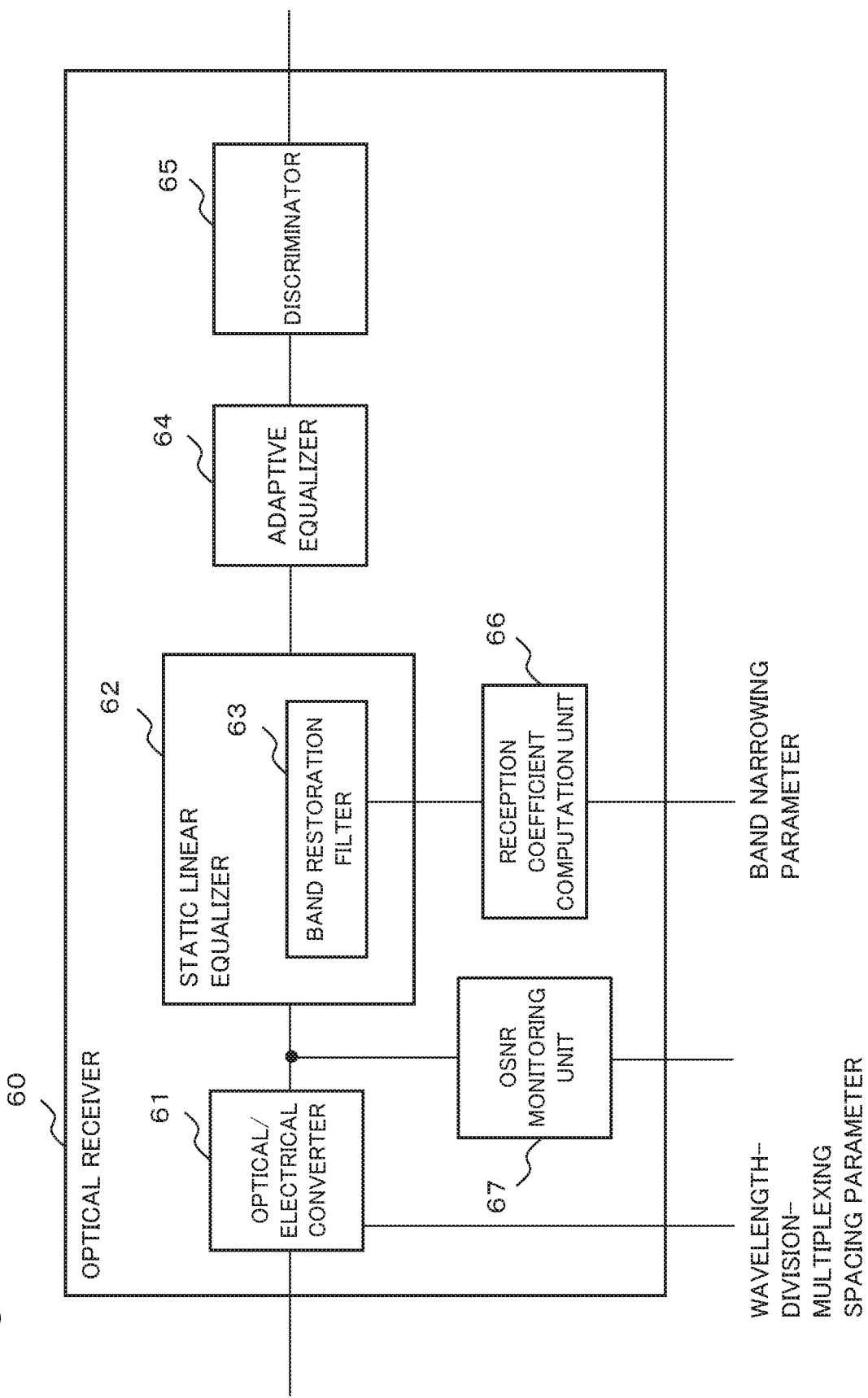
FIG. 19 is a diagram illustrating a configuration of an optical receiver of the third example embodiment according to the present invention.

A configuration of each optical receiver 60 will be described. FIG. 19 is a diagram illustrating the configuration of the optical receiver 60. The optical receiver 60 includes an optical/electrical converter 61, a static linear equalizer 62, an adaptive equalizer 64, a discriminator 65, a reception coefficient computation unit 66, and an optical signal to noise ratio (OSNR) monitoring unit 67. The static linear equalizer 62 further includes a band restoration filter 63. The configurations and functions of the optical/electrical converter 61, the static linear equalizer 62, the band restoration filter 63, the adaptive equalizer 64, the discriminator 65, and the reception coefficient computation unit 66 of the present example embodiment are similar to those of the components with the same names of the second example embodiment.

The OSNR monitoring unit 67 monitors an output signal from the optical/electrical converter 61 and measures an OSNR of a reception signal. The OSNR monitoring unit 67 sends a measurement result of the OSNR of a reception signal to the communication control device 310 as an OSNR monitoring result.

Figure 20:
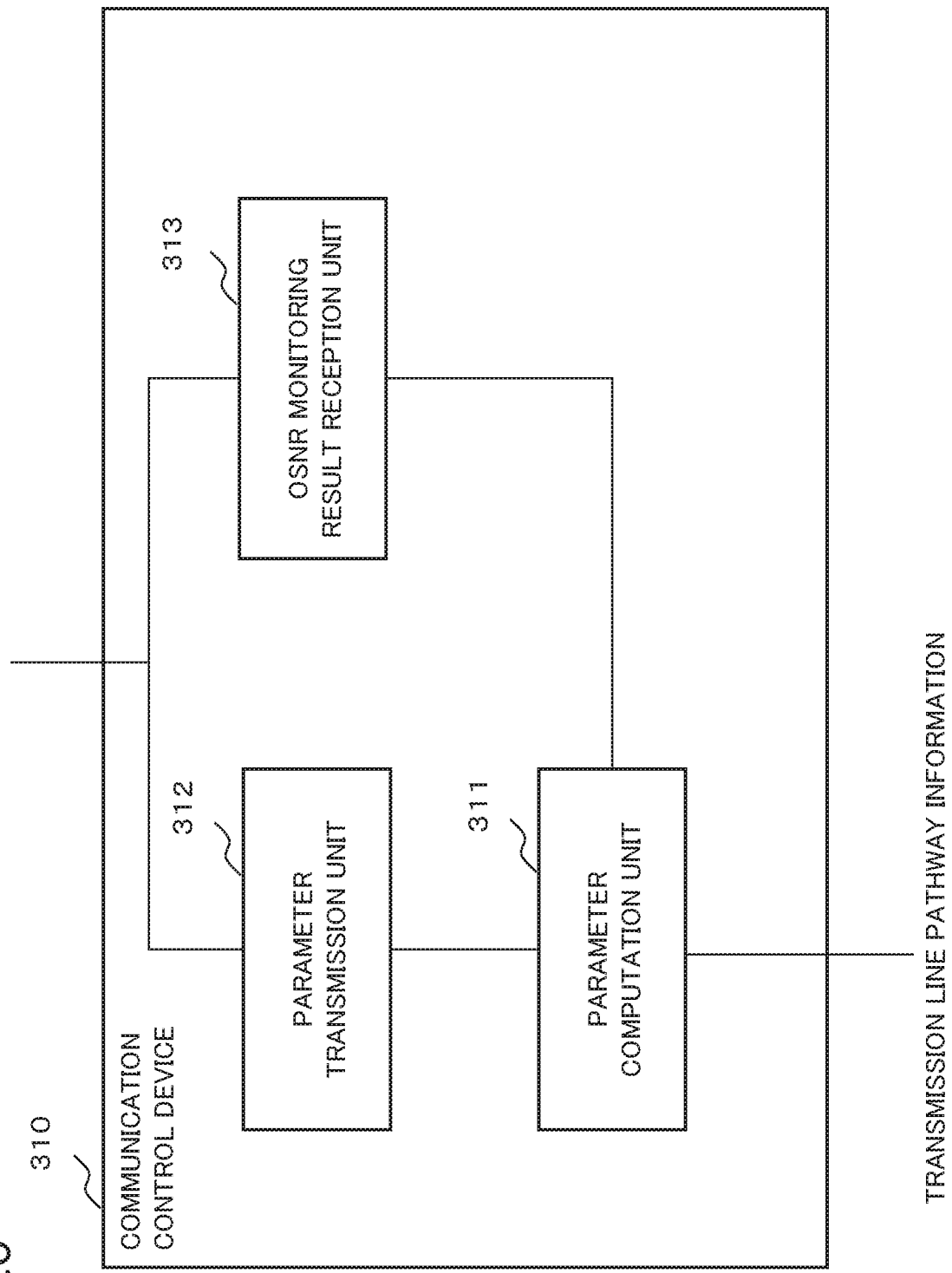
FIG. 20 is a diagram illustrating a configuration of a communication control device of the third example embodiment according to the present invention.

A configuration of the communication control device 310 will be described. FIG. 20 is a diagram illustrating the configuration of the communication control device 310 of the present example embodiment.

The communication control device 310 includes a parameter computation unit 311, a parameter transmission unit 312, and an OSNR monitoring result reception unit 313. The configuration and functions of the parameter transmission unit 312 of the present example embodiment are similar to those of the parameter transmission unit 302 of the second example embodiment.

The parameter computation unit 311 computes the band narrowing parameter and a wavelength-division-multiplexing spacing parameter, based on transmission line pathway information input by an administrator or the like and OSNR monitoring results. The parameter computation unit 311 computes the band narrowing parameter and the wavelength-division-multiplexing spacing parameter in a similar manner to the second example embodiment, using the OSNR monitoring results as transmission characteristics of the transmission line. The parameter computation unit 311 sends information of wavelengths, a wavelength spacing, and a band narrowing factor of optical signals of the respective channels to the parameter transmission unit 312.

The OSNR monitoring result reception unit 313 receives an OSNR monitoring result that the OSNR monitoring unit 67 of each optical receiver 60 measured, via the communication line 402. The OSNR monitoring result reception unit 313 sends the OSNR monitoring result received from each optical receiver 60 to the parameter computation unit 311.

Figure 21:
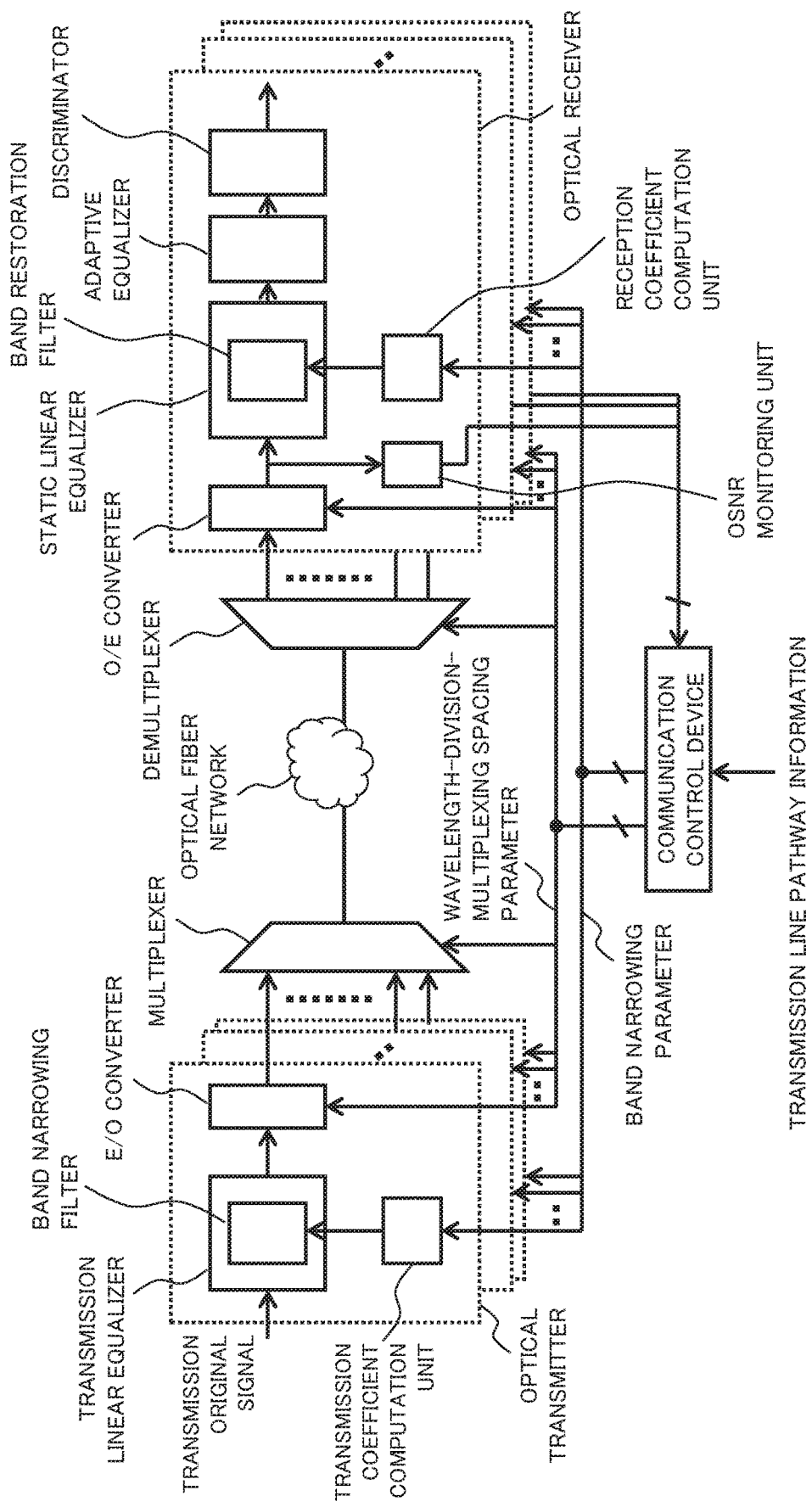
FIG. 21 is a diagram schematically illustrating a configuration of and data flows in the third example embodiment according to the present invention.

FIG. 21 is a diagram schematically illustrating a configuration of an optical communication system of and data flows of respective parameters in the present example embodiment. In FIG. 21, the electrical/optical converter 33 is illustrated as an E/O converter. In FIG. 21, the optical/electrical converter 61 is illustrated as an O/E converter. In FIG. 21, the optical fiber transmission line 401 is illustrated as an optical fiber network.

As illustrated in FIG. 21, in the optical communication system of the present example embodiment, a measurement result of the OSNR of a reception signal is sent from an OSNR monitoring unit 67 of each optical receiver to a communication control device. A band narrowing parameter is sent from the communication control device to a transmission coefficient computation unit of each optical transmitter and a reception coefficient computation unit of each optical receiver. A wavelength-division-multiplexing spacing parameter is sent from the communication control device to a multiplexer and the E/O converter of each optical transmitter and a demultiplexer and the O/E converter of each optical receiver. Transmission original signals input to the respective optical transmitters are subjected to band narrowing filter processing that narrows bandwidth to less than or equal to a baud rate by transmission linear equalizers, multiplexed at wavelength spacings less than or equal to the baud rate by the multiplexer, and transmitted. A multiplexed signal transmitted through the optical fiber network is demultiplexed into reception signals, which are input to the respective receivers, and restoration of bandwidth of the reception signals is performed by static linear equalizers.

Operation of the optical communication system of the present example embodiment will be described. Operations in the optical communication system of the present example embodiment are the same as those in the second example embodiment except operations in which each OSNR monitoring unit 67 measures an OSNR of a reception signal and the parameter computation unit 311 computes respective parameters, using OSNR monitoring results as characteristics of a transmission line. Therefore, in the following description, the operations in which each OSNR monitoring unit 67 measures an OSNR of a reception signal and the parameter computation unit 311 computes respective parameters, using OSNR monitoring results as transmission characteristics will be mainly described.

In an initial state, the optical communication system of the present example embodiment, as with the second example embodiment, starts operation, based on information of transmission characteristics input in conjunction with transmission line pathway information by an administrator or the like.

When transmission of multiplexed signals is performed, a multiplexed signal transmitted through the optical fiber transmission line 401 is separated into optical signals of respective channels by the demultiplexer 52 of the reception device 500, and the optical signals are sent to the corresponding optical receivers 60. When an optical signal has been input to the optical/electrical converter 61 of each optical receiver 60, the optical signal is converted to an electrical signal, which is sent to the static linear equalizer 62 and the OSNR monitoring unit 67.

When a reception signal has been input, the OSNR monitoring unit 67 measures an OSNR of the reception signal. When having measured an OSNR, the OSNR monitoring unit 67 sends a measurement result to the communication control device 310 as an OSNR monitoring result via the communication line 402.

The OSNR monitoring result input to the communication control device 310 is sent to the OSNR monitoring result reception unit 313. When having received the OSNR monitoring result, the OSNR monitoring result reception unit 313 sends the received OSNR monitoring result to the parameter computation unit 311.

When having received OSNR monitoring results, the parameter computation unit 311 computes a band narrowing parameter and a wavelength-division-multiplexing spacing parameter, using the received OSNR monitoring results as transmission characteristics of optical signals in the transmission line. The parameter computation unit 311 computes the band narrowing parameter and the wavelength-division-multiplexing spacing parameter in a similar manner to the second example embodiment, using the OSNR monitoring results as characteristics of the transmission line. When having computed the band narrowing parameter and the wavelength-division-multiplexing spacing parameter, the parameter computation unit 311 sends the respective computed parameters to the parameter transmission unit 312.

When having received the band narrowing parameter and the wavelength-division-multiplexing spacing parameter, the parameter transmission unit 312 sends the respective received parameters to the transmission device 100 and the reception device 500 via the communication line 402.

When having received the newly-computed band narrowing parameter and wavelength-division-multiplexing spacing parameter, the transmission device 100 and the reception device 500, as with the second example embodiment, perform operations of narrowing and restoration of bands, based on the newly-received parameters.

The optical communication system of the present example embodiment has similar advantageous effects to those of the optical communication system of the second example embodiment. In addition, in the optical communication system of the present example embodiment, the parameter computation unit 311 computes the band narrowing parameter and the wavelength-division-multiplexing spacing parameter in such a way that an optimum bandwidth and multiplexing spacing according to transmission characteristics are set, using OSNRs measured by the OSNR monitoring units 67 as the transmission characteristics. In the optical communication system of the present example embodiment, by treating actual values of the OSNR of reception signals as transmission characteristics, it is possible to optimize the bandwidth and the multiplexing spacing according to a state of the transmission line even when a state and the like of pathways and the transmission line have changed. Note that there is generally a correlation between the OSNR of reception signals and the reception Q-value and the parameters may therefore be computed, in addition to through theoretical computation, using a relationship between the reception OSNR and the reception Q-value that is obtained empirically or experimentally. As a result, the communication system of the present example embodiment is capable of performing more optimum high-density wavelength division multiplexing according to transmission conditions and therefore enables frequency usage efficiency to be further improved.

FOURTH EXAMPLE EMBODIMENT

Figure 22:
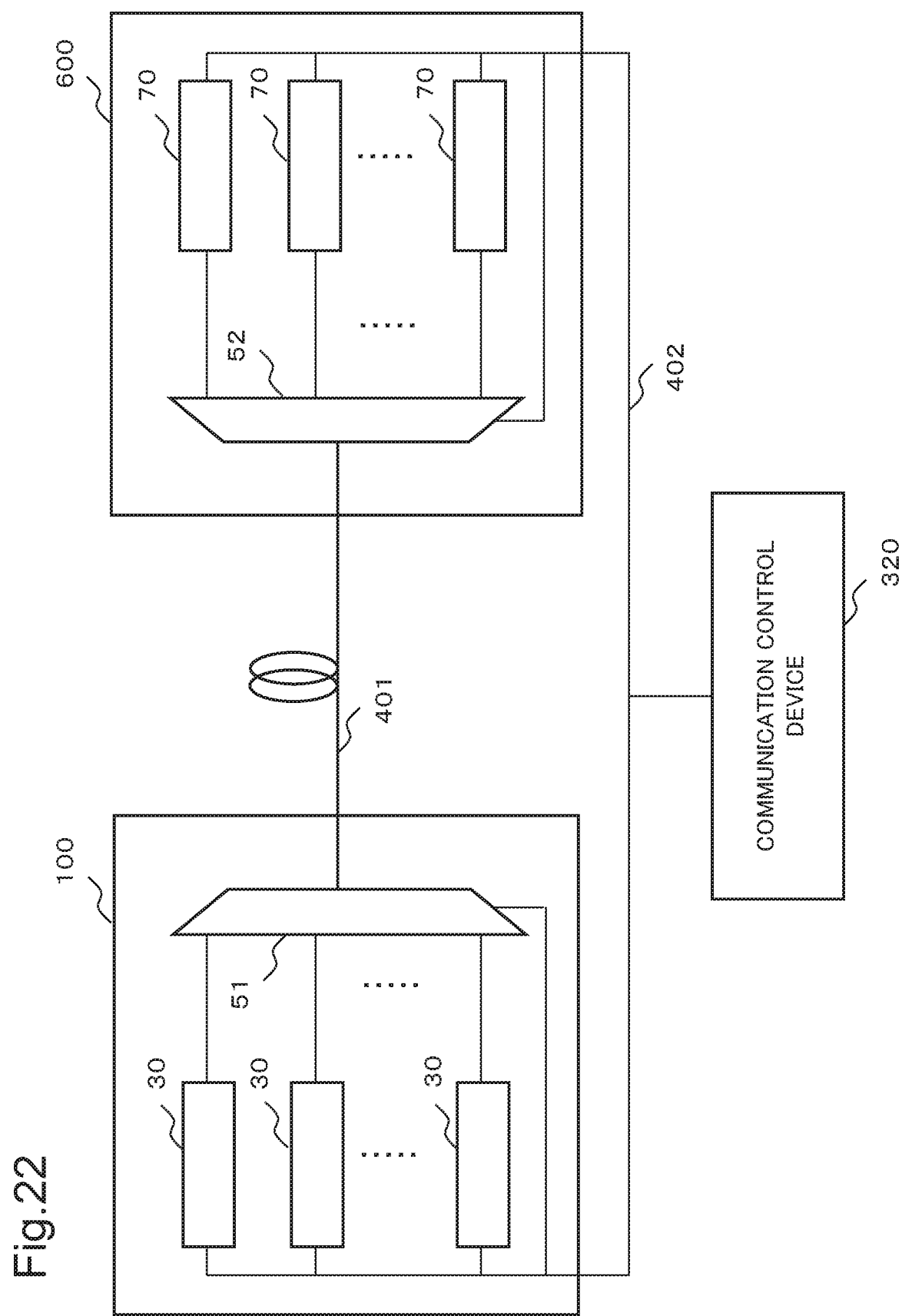
FIG. 22 is a diagram illustrating an outline of a configuration of a fourth example embodiment according to the present invention.

A fourth example embodiment of the present invention will be described in detail with reference to the drawings. FIG. 22 is a diagram illustrating an outline of a configuration of an optical communication system according to the present example embodiment.

The optical communication system of the present example embodiment includes a transmission device 100, a reception device 600, and a communication control device 320. The transmission device 100 and the reception device 600 are interconnected via an optical fiber transmission line 401. The communication control device 320 is connected to the transmission device 100 and the reception device 600 via a communication line 402.

The optical communication system of the present example embodiment is, as with the second example embodiment, a digital optical communication system that transmits a wavelength-division-multiplexed optical signal from the transmission device 100 to the reception device 600 via the optical fiber transmission line 401. The optical communication system of the present example embodiment, as with the second example embodiment, performs communication, using the digital coherent method and the super-Nyquist transmission method.

In the second example embodiment, a band narrowing parameter is computed in the communication control device, using characteristics of a transmission line measured in advance. The optical communication system of the present example embodiment is characterized in that, in place of such a configuration, signal spectra of signals transmitted through the optical fiber transmission line 401 are acquired and a band narrowing parameter and a wavelength-division-multiplexing spacing parameter are computed based on transmission characteristics extracted from the signal spectra.

The configurations and functions of the transmission device 100 and the optical fiber transmission line 401 of the present example embodiment are similar to those of the second example embodiment.

The reception device 600 includes a plurality of optical receivers 70 and a demultiplexer 52. The configuration and functions of the demultiplexer 52 of the present example embodiment are similar to those of the demultiplexer 52 of the second example embodiment. The optical receivers 70 are provided in such a way as to correspond to optical transmitters 30.

Figure 23:
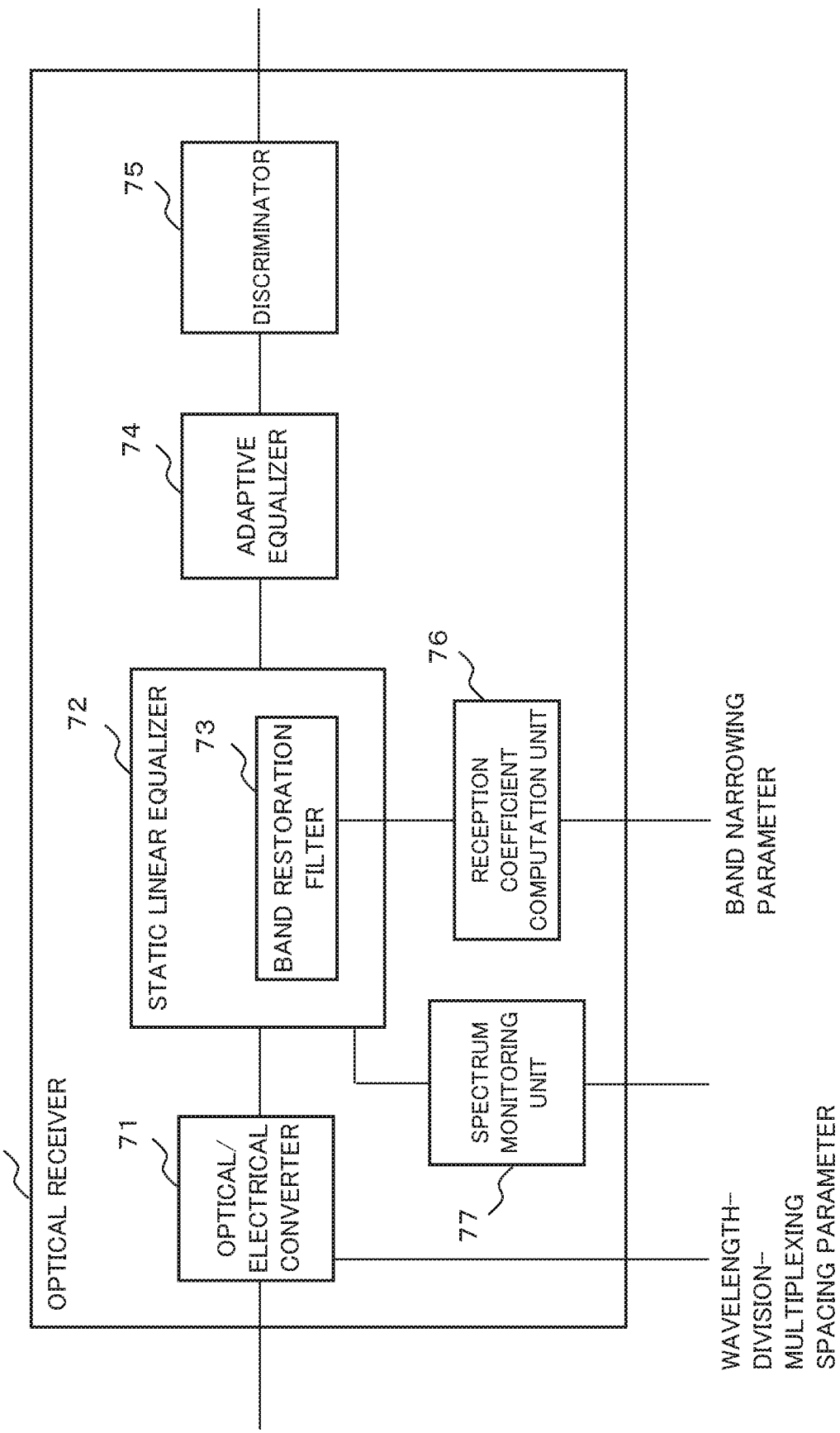
FIG. 23 is a diagram illustrating a configuration of an optical receiver of the fourth example embodiment according to the present invention.

A configuration of each optical receiver 70 will be described. FIG. 23 is a diagram illustrating the configuration of the optical receiver 70. The optical receiver 70 includes an optical/electrical converter 71, a static linear equalizer 72, an adaptive equalizer 74, a discriminator 75, a reception coefficient computation unit 76, and a spectrum monitoring unit 77. The static linear equalizer 72 further includes a band restoration filter 73. The configurations and functions of the optical/electrical converter 71, the static linear equalizer 72, the band restoration filter 73, the adaptive equalizer 74, the discriminator 75, and the reception coefficient computation unit 76 of the present example embodiment are similar to those of the components with the same names of the second example embodiment.

The spectrum monitoring unit 77 has a function of monitoring linear equalization processing of a reception signal, and the like in the static linear equalizer 72 and acquiring spectral data of the reception signal. The acquisition of spectral data of a reception signal in the spectrum monitoring unit 77 is performed in the following manner.

Each static linear equalizer 72 on the reception side is constituted by a frequency-domain equalizer that has a high circuit use efficiency in order to perform compensation for wavelength dispersion, which requires long impulse response length. The static linear equalizer 72 once converts a received time-domain signal to a frequency-domain signal through fast Fourier transform (FFT) processing. Subsequently, the static linear equalizer 72 performs processing of multiplying the frequency-domain signal by a predetermined linear filter characteristic and thereafter reconverting the multiplication result to a time-domain signal again through inverse fast Fourier transform (IFFT) processing. Since a frequency-domain signal after the FFT processing represents an instantaneous frequency spectrum itself, the spectrum monitoring unit 77 is able to acquire data of a spectral shape of a reception signal by averaging the internal computation results in the static linear equalizer 72.

Figure 24A:
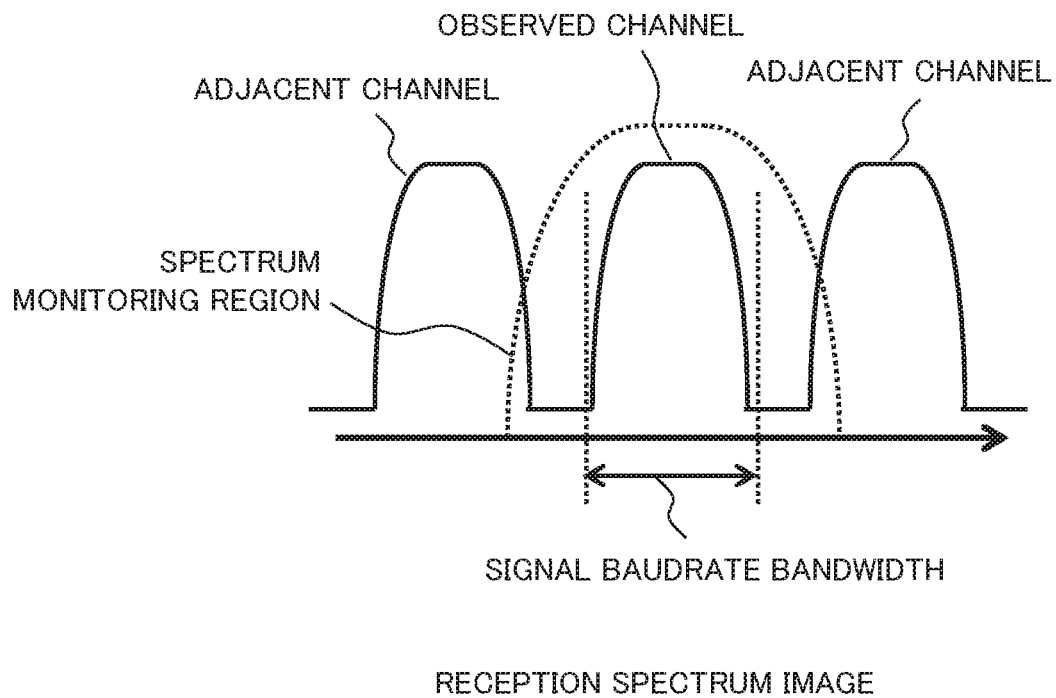
FIG. 24A is a diagram illustrating a spectral image of reception signals in the fourth example embodiment according to the present invention.
Figure 24B:
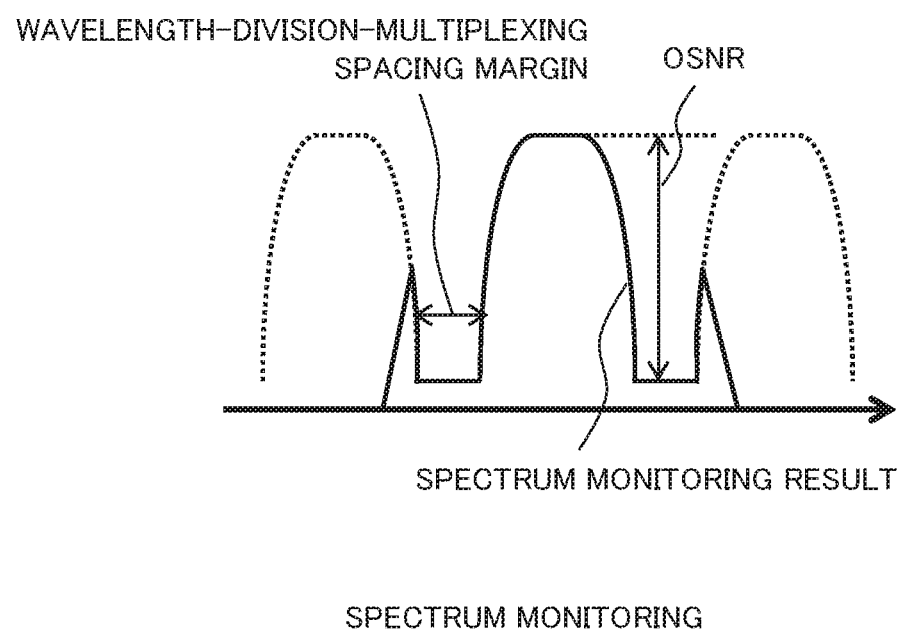
FIG. 24B is a diagram illustrating an example of a spectrum monitoring result in the fourth example embodiment according to the present invention.

While an acquirable spectral region is determined by the analog band and a sampling frequency of an optical/electrical converter, analog/digital conversion is often performed at a sampling frequency approximately twice a baud rate. Since the analog band has a wider bandwidth than the signal baud rate, portions of adjacent channels are also included in a monitoring region as illustrated in FIG. 24A when high-density wavelength division multiplexing is performed. Therefore, as illustrated in FIG. 24B, a wavelength-division-multiplexing spacing margin with an adjacent channel and a difference between signal peak power and noise floor, which is equivalent to an OSNR, can be monitored in an acquired spectrum. Monitoring spectra in this way enables the wavelength-division-multiplexing spacing to be controlled in a more detailed manner, based on estimation of the amount of acceptable deterioration in the Q-value in band narrowing and the amount of crosstalk with adjacent channels, and the like.

Each spectrum monitoring unit 77 sends acquired spectral data to the communication control device 320 via the communication line 402.

Figure 25:
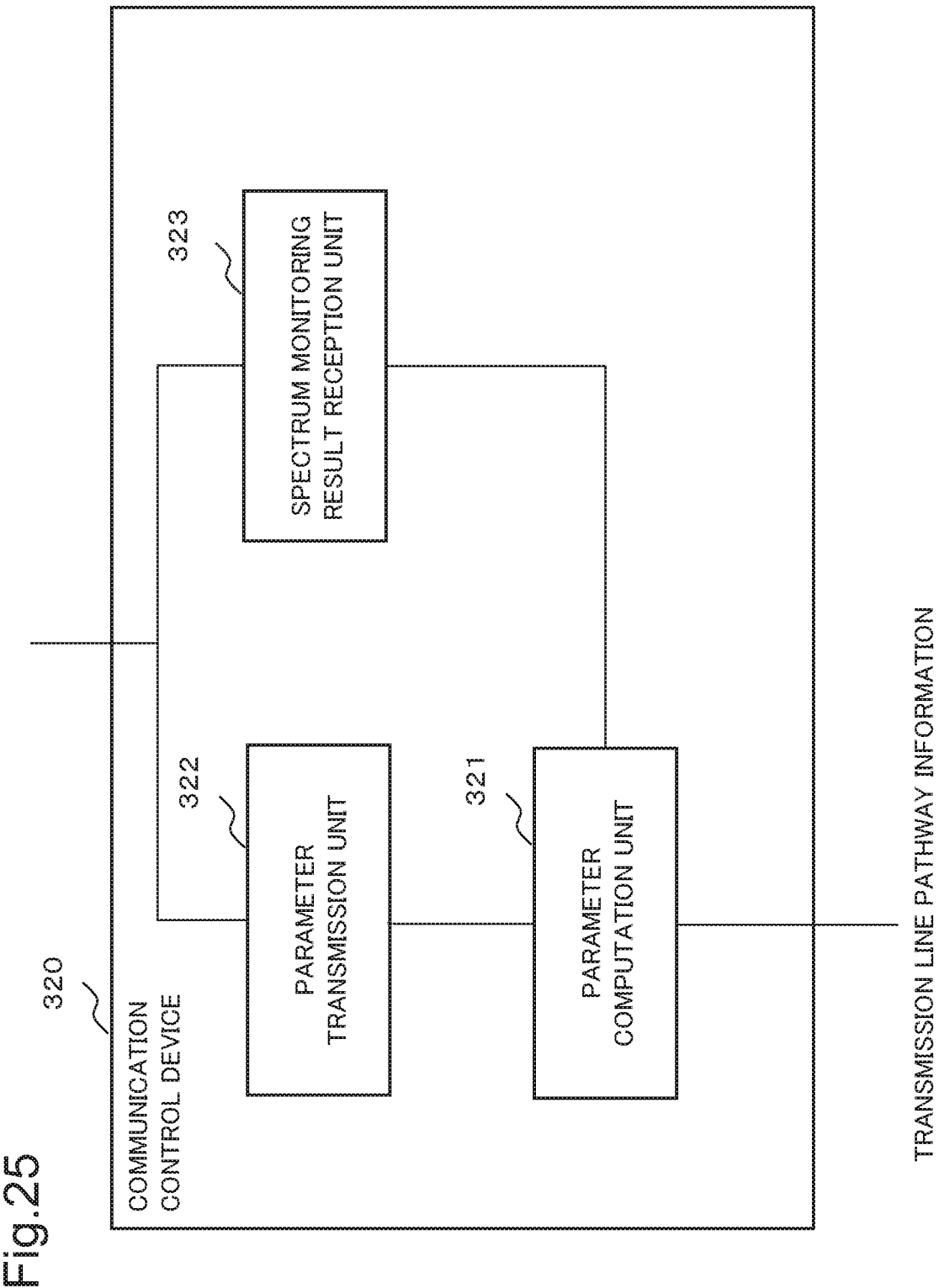
FIG. 25 is a diagram illustrating a configuration of a communication control device of the fourth example embodiment according to the present invention.

A configuration of the communication control device 320 will be described. FIG. 25 is a diagram illustrating a configuration of the communication control device 320 of the present example embodiment. The communication control device 320 includes a parameter computation unit 321, a parameter transmission unit 322, and a spectrum monitoring result reception unit 323. The configuration and functions of the parameter transmission unit 322 of the present example embodiment are similar to those of the parameter transmission unit 302 of the second example embodiment.

The parameter computation unit 321 computes the band narrowing parameter and the wavelength-division-multiplexing spacing parameter, based on transmission line pathway information input by an administrator or the like and spectrum monitoring results. The parameter computation unit 321, for example, extracts a wavelength-division-multiplexing spacing margin with an adjacent channel and a difference between signal peak power and noise floor, which is equivalent to an OSNR, from spectral data as characteristic data of the transmission line. The parameter computation unit 321 computes the band narrowing parameter and the wavelength-division-multiplexing spacing parameter in a similar manner to the second example embodiment, based on the transmission line pathway information and the data of transmission characteristics extracted from the spectral data. The parameter computation unit 321 sends information of wavelengths, a wavelength spacing, and a band narrowing factor of optical signals of the respective channels to the parameter transmission unit 322.

The spectrum monitoring result reception unit 323 receives spectral data of a reception signal that the spectrum monitoring unit 77 of each optical receiver 70 measured, via the communication line 402. The spectrum monitoring result reception unit 323 sends the spectral data received from each optical receiver 70 to the parameter computation unit 321.

Figure 26:
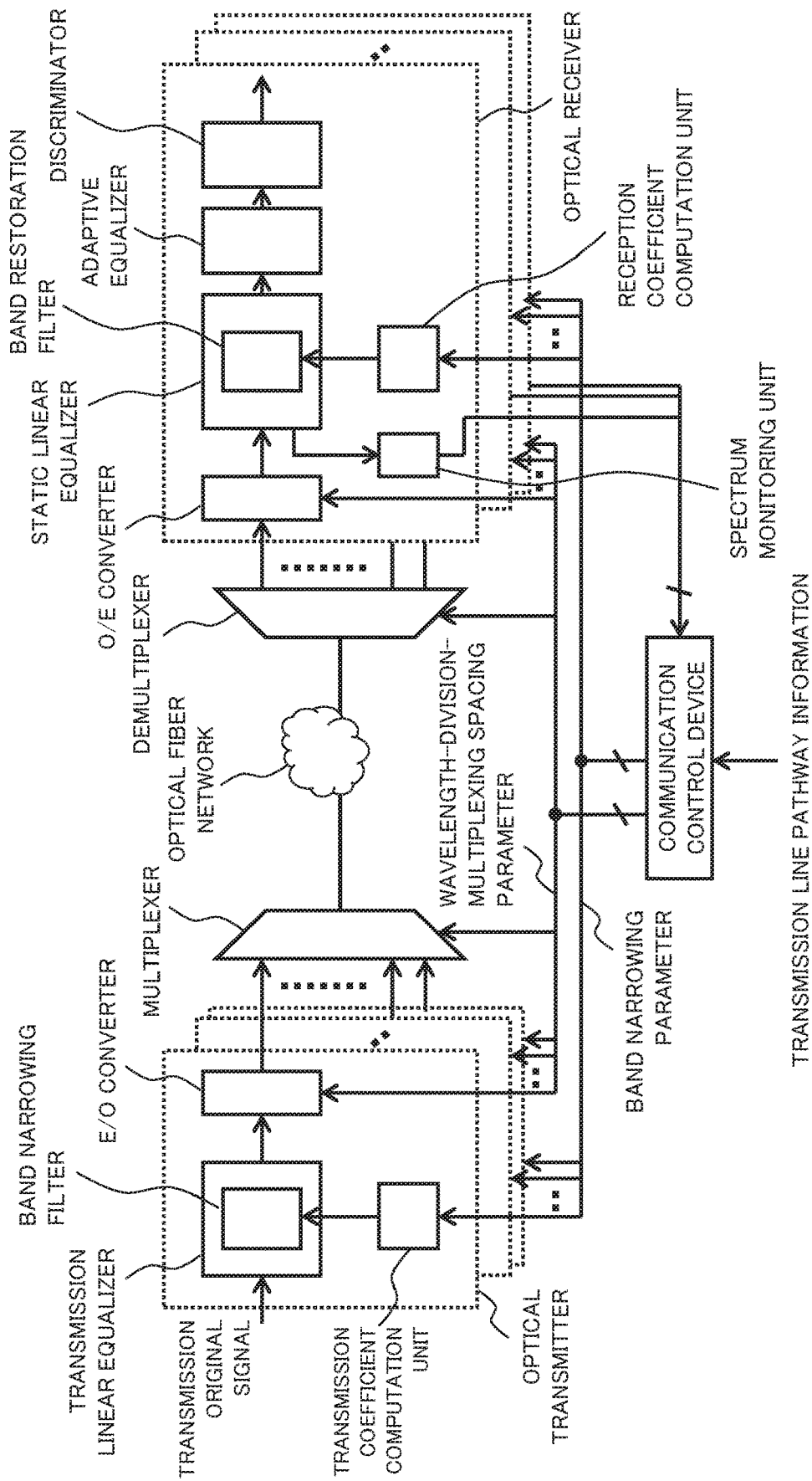
FIG. 26 is a diagram schematically illustrating a configuration of and data flows in the fourth example embodiment according to the present invention.

FIG. 26 is a diagram schematically illustrating a configuration of an optical communication system of and data flows of respective parameters in the present example embodiment. In FIG. 26, the electrical/optical converter 33 is illustrated as an E/O converter. In FIG. 26, the optical/electrical converter 71 is illustrated as an O/E converter. In FIG. 26, the optical fiber transmission line 401 is illustrated as an optical fiber network.

As illustrated in FIG. 26, in the optical communication system of the present example embodiment, spectral data of a reception signal is sent from a spectrum monitoring unit 77 of each optical receiver to a communication control device. A band narrowing parameter is sent from the communication control device to a transmission coefficient computation unit of each optical transmitter and a reception coefficient computation unit of each optical receiver. A wavelength-division-multiplexing spacing parameter is sent from the communication control device to a multiplexer and the E/O converter of each optical transmitter and a demultiplexer and the O/E converter of each optical receiver. Transmission original signals input to the respective optical transmitters are subjected to band narrowing filter processing that narrows bandwidth to less than or equal to a baud rate by transmission linear equalizers, multiplexed at wavelength spacings less than or equal to the baud rate by the multiplexer, and transmitted. A multiplexed signal transmitted through the optical fiber network is demultiplexed into reception signals, which are input to the respective optical receivers, and restoration of bandwidth of the reception signals is performed by static linear equalizers.

Operation of the optical communication system of the present example embodiment will be described. Operations in the optical communication system of the present example embodiment are the same as those in the second example embodiment except operations in which each spectrum monitoring unit 77 measures spectral data of a reception signal and the parameter computation unit 321 extracts characteristics of a transmission line from the spectral data and computes respective parameters.

Therefore, in the following description, the operations in which each spectrum monitoring unit 77 measures spectral data of a reception signal and the parameter computation unit 321 extracts characteristics of a transmission line from the spectral data and computes respective parameters will be mainly described.

In an initial state, the optical communication system of the present example embodiment, as with the second example embodiment, starts operation, based on information of transmission characteristics input in conjunction with transmission line pathway information by an administrator or the like.

When transmission of multiplexed signals is performed, a multiplexed signal transmitted through the optical fiber transmission line 401 is separated into optical signals of respective channels by the demultiplexer 52 of the reception device 600, and the optical signals are sent to the corresponding optical receivers 70. When an optical signal has been input to the optical/electrical converter 71 of each optical receiver 70, the optical signal is converted to an electrical signal, which is sent to the static linear equalizer 72 as a reception signal.

When a reception signal has been input, the static linear equalizer 72 performs wavelength dispersion compensation and band restoration filter processing of the reception signal. When the static linear equalizer 72 performs equalization processing of the reception signal, including the wavelength dispersion compensation and the like, the spectrum monitoring unit 77 acquires spectral data from the static linear equalizer 72.

When having acquired the spectral data, the spectrum monitoring unit 77 transmits data obtained by averaging the spectral data for each predetermined time period to the communication control device 320 as a spectrum monitoring result via the communication line 402. The predetermined time period when spectral data are acquired is set in advance as a time period for which spectral data can be stably acquired suppressing influence from instantaneous change.

The spectrum monitoring result input to the communication control device 320 is sent to the spectrum monitoring result reception unit 323. When having received the spectrum monitoring result as spectral data, the spectrum monitoring result reception unit 323 sends the received spectral data to the parameter computation unit 321.

When having received the spectral data of reception signals, the parameter computation unit 321 extracts data of transmission characteristics in the transmission line from the received spectral data. When having extracted the data of transmission characteristics, the parameter computation unit 321 computes the band narrowing parameter and the wavelength-division-multiplexing spacing parameter, based on the extracted transmission characteristics. When having computed the band narrowing parameter and the wavelength-division-multiplexing spacing parameter, the parameter computation unit 321 sends the respective computed parameters to the parameter transmission unit 322.

When having received the band narrowing parameter and the wavelength-division-multiplexing spacing parameter, the parameter transmission unit 322 sends the respective received parameters to the transmission device 100 and the reception device 600 via the communication line 402.

When having received the newly-computed band narrowing parameter and wavelength-division-multiplexing spacing parameter, the transmission device 100 and the reception device 600 perform operations of narrowing and restoration of bands, which are similar to those in the second example embodiment, based on the newly-received parameters.

The optical communication system of the present example embodiment has similar advantageous effects to those of the optical communication system of the second example embodiment. In addition, in the optical communication system of the present example embodiment, the parameter computation unit 301 computes the respective parameters in such a way that an optimum bandwidth and multiplexing spacing according to transmission characteristics are set, based on the transmission characteristics extracted from spectra of reception signals measured by the spectrum monitoring units 77. In the optical communication system of the present example embodiment, by using transmission characteristics extracted from spectral data of reception signals, it is possible to optimize the bandwidth and the multiplexing spacing, based on more accurate data on a state of the transmission line. Therefore, in the optical communication system of the present example embodiment, it is possible to compute an optimum bandwidth and multiplexing spacing according to a state of the transmission line and thereby optimize frequency efficiency even when the state of pathways and the transmission line for transmission of optical signals has changed. As a result, the optical communication system of the present example embodiment enables optimum high-density wavelength division multiplexing according to transmission conditions to be performed and thereby enables frequency usage efficiency to be improved.

Although, in the first to fourth example embodiments, a multiplexed signal is transmitted only in one direction from the transmission device to the reception device, bidirectional communication may be performed using a transmission device that has the functions of both a transmission device and a reception device. When such a configuration is employed, it may be configured such that the communication control device is placed at the same location as that of either the transmission device or the reception device and, by superimposing a signal based on a measurement result and information of respective parameters on a multiplexed signal, the respective information is notified and shared.

The transmission linear equalizer and the transmission coefficient computation unit in an optical transmitter of each of the second to fourth example embodiments can, for example, be configured using semiconductor devices in which circuits for performing processing of the respective functions are formed. In addition, the static linear equalizer, the adaptive equalizer, the discriminator and the reception coefficient computation unit in an optical receiver of each of the second to fourth example embodiments can, for example, be configured using semiconductor devices in which circuits for performing processing of the respective functions are formed. The OSNR monitoring unit of each optical receiver of the third example embodiment, the spectrum monitoring unit of each optical receiver of the fourth example embodiment, and the parameter computation unit of the communication control device of each example embodiment can also be configured using semiconductor devices in which circuits for performing processing of the respective functions are formed, in a similar manner. The parameter transmission unit of the communication control device of each example embodiment can be configured using a semiconductor device in which circuits for performing processing of a communication module and respective functions are formed. The OSNR monitoring result reception unit of the third example embodiment and the spectrum monitoring result reception unit of the fourth example embodiment can also be configured using semiconductor devices in which circuits for performing processing of a communication module and respective functions are formed, in a similar manner.

The processing in the above-described respective components may be performed by executing programs performing processing of the respective functions in a device constituted by a central processing unit (CPU), a memory element, and the like.

The whole or part of the example embodiments disclosed above can be described as, but not limited to, the following supplementary notes.

(Supplementary Note 1)

A reception device comprising:

a separation means for receiving a multiplexed signal into which signals of respective channels to which spectral shaping that narrows bandwidth to less than or equal to a baud rate is applied as band narrowing filter processing on a transmission side, based on a band narrowing parameter that, based on characteristics of a transmission line transmitting optical signals, is set as a parameter indicating a degree of bandwidth narrowing of a signal are wavelength-division-multiplexed at spacings less than or equal to the baud rate and separating the multiplexed signal into the optical signals for the respective channels; and a plurality of optical reception means each of which comprises an optical/electrical conversion means for acquiring, as a wavelength-division-multiplexing spacing parameter, information of center wavelengths of the optical signals for the respective channels and a spacing between the center wavelengths that are set based on characteristics of the transmission line, converting the optical signal of the assigned channel to an electrical signal, based on the wavelength-division-multiplexing spacing parameter, and outputting the electrical signal as a reception signal, a reception coefficient computation means for acquiring the band narrowing parameter and, based on the band narrowing parameter, computing a filter coefficient when processing having inverse characteristics to those of the band narrowing filter processing applied on the transmission side is applied to the reception signal as band restoration filter processing, and a band restoration means for applying the band restoration filter processing to the reception signal, based on the filter coefficient computed by the reception coefficient computation means and thereby restoring a band of the reception signal.

(Supplementary Note 2)

The reception device according to supplementary note 1, in which the band narrowing parameter is set as a band narrowing factor that indicates a ratio of a bandwidth after the band narrowing filter processing to a bandwidth matching a baud rate.

(Supplementary Note 3)

The reception device according to supplementary note 1 or 2 further comprising a noise measurement means for measuring a signal-to-noise ratio of the optical signal received via the transmission line and transmitting information of the signal-to-noise ratio, in which each reception coefficient computation means acquires the band narrowing parameter that is set using information of the signal-to-noise ratio as characteristics of the transmission line from a transmission destination of information of the signal-to-noise ratio.

(Supplementary Note 4)

The reception device according to supplementary note 1 or 2 further comprising a spectrum acquisition means for acquiring a signal spectrum of the optical signal received via the transmission line and transmitting information of the signal spectrum, in which each reception coefficient computation means acquires the band narrowing parameter that is set based on characteristics of the transmission line extracted from information of the signal spectrum from a transmission destination of information of the signal spectrum.

(Supplementary Note 5)

The reception device according to supplementary note 4, in which the spectrum acquisition means monitors linear equalization processing of the reception signal and acquires the signal spectrum.

(Supplementary Note 6)

The reception device according to any one of supplementary notes 1 to 3, wherein each optical/electrical conversion means makes local oscillator light having a wavelength based on the wavelength-division-multiplexing spacing parameter and the optical signal input from the separation means interfere with each other and thereby performs coherent detection.

(Supplementary Note 7)

The reception device according to any one of supplementary notes 1 to 6, wherein the separation means acquires the wavelength-division-multiplexing spacing parameter and separates the multiplexed signal into optical signals for the respective channels, based on the wavelength-division-multiplexing spacing parameter.

(Supplementary Note 8)

A transmission device comprising:

a plurality of optical transmission means each of which comprises a transmission coefficient computation means for acquiring a parameter indicating a degree of bandwidth narrowing when spectral shaping that narrows bandwidth of a signal to less than or equal to a baud rate is performed, as a band narrowing parameter that is set based on characteristics of a transmission line transmitting optical signals and computing a filter coefficient when processing of narrowing the bandwidth of the signal is applied as band narrowing filter processing, a band narrowing means for, based on the filter coefficient computed by the transmission coefficient computation means, applying processing of narrowing the bandwidth of the signal as band narrowing filter processing, and an electrical/optical conversion means for acquiring, as a wavelength-division-multiplexing spacing parameter, information of center wavelengths of the optical signals for respective channels and a spacing between the center wavelengths that are set based on characteristics of the transmission line and converting the signal the bandwidth of which is narrowed to less than or equal to the baud rate by the band narrowing means to the optical signal, based on the wavelength-division-multiplexing spacing parameter; and a multiplexing means for multiplexing the optical signals of the channels output from the plurality of optical transmission means into a multiplexed signal, at spacings less than or equal to the baud rate and outputting the multiplexed signal to the transmission line.

(Supplementary Note 9)

The transmission device according to supplementary note 8, wherein the band narrowing parameter is set as a band narrowing factor that indicates a degree of band narrowing in the band narrowing filter processing.

(Supplementary Note 10)

The transmission device according to supplementary note 8 or 9, wherein the multiplexing means acquires, as the wavelength-division-multiplexing spacing parameter, information of a wavelength spacing between the optical signals when the optical signals that the plurality of optical transmission means generated are multiplexed and multiplexes the optical signals at wavelength spacings based on the wavelength-division-multiplexing spacing parameter.

(Supplementary Note 11)

A communication control device comprising:

a parameter computation means for, based on information of pathways of a transmission line for optical signals and characteristics of the transmission line, computing a band narrowing parameter that indicates information of bandwidth when spectral shaping that narrows the bandwidth to less than or equal to a baud rate is applied to signals of respective channels and a wavelength-division-multiplexing spacing parameter that indicates center wavelengths of the optical signals for the respective ones of a plurality of the channels and a wavelength spacing between the center wavelengths; and a parameter transmission means for transmitting the band narrowing parameter and the wavelength-division-multiplexing spacing parameter to both a transmission side and a reception side of the optical signals.

(Supplementary Note 12)

The communication control device according to supplementary note 11, wherein the parameter computation means computes the band narrowing parameter and the wavelength-division-multiplexing spacing parameter, using, as characteristics of the transmission line, information of signal-to-noise ratios of the signals acquired from a reception side of the optical signals.

(Supplementary Note 13)

The communication control device according to supplementary note 11, wherein the parameter computation means extracts characteristics of the transmission line from information of signal spectra of the optical signals acquired from a reception side of the optical signals and computes the band narrowing parameter and the wavelength-division-multiplexing spacing parameter, based on the extracted characteristics of the transmission line.

(Supplementary Note 14)

An optical communication system comprising:

a transmission device according to any one of supplementary notes 8 to 10;

a reception device according to any one of supplementary notes 1 to 7; and a communication control device according to any one of supplementary notes 11 to 13, in which the communication control device transmits the band narrowing parameter and the wavelength-division-multiplexing spacing parameter to both the transmission device and the reception device, the transmission device receives the band narrowing parameter and the wavelength-division-multiplexing spacing parameter from the communication control device, converts signals to which the band narrowing filter processing is applied based on the band narrowing parameter to the optical signals, based on the wavelength-division-multiplexing spacing parameter, and multiplexes the optical signals of a plurality of the channels into the multiplexed signal and transmits the multiplexed signal to the transmission line, and the reception device receives the band narrowing parameter and the wavelength-division-multiplexing spacing parameter from the communication control device, converts the optical signals into which the multiplexed signal received from the transmission device via the transmission line are separated to electrical signals, based on the wavelength-division-multiplexing spacing parameter, and applies the band restoration filter processing to reception signals that have been converted to the electrical signals, based on the band narrowing parameter.

(Supplementary Note 15)

An optical communication method comprising:

separating a multiplexed signal into which signals of respective channels to which spectral shaping that narrows bandwidth of a signal to less than or equal to a baud rate is applied as band narrowing filter processing, based on a band narrowing parameter that, based on characteristics of a transmission line transmitting optical signals, is set as a parameter indicating a degree of bandwidth narrowing of a signal are multiplexed at spacings less than or equal to the baud rate into optical signals for the respective channels;

acquiring information of center wavelengths of optical signals for the respective channels and a spacing between the center wavelengths that are set based on characteristics of a transmission line, as a wavelength-division-multiplexing spacing parameter, converting the optical signals of the assigned channels to electrical signals, based on the wavelength-division-multiplexing spacing parameter, and outputting the electrical signals as reception signals, acquiring the band narrowing parameter and, based on the band narrowing parameter, computing a filter coefficient when processing having inverse characteristics to those of the band narrowing filter processing is applied to the reception signals as band restoration filter processing, and applying the band restoration filter processing to the reception signals, based on the computed filter coefficient and thereby restoring bands of the reception signals.

(Supplementary Note 16)

The optical communication method according to supplementary note 15, wherein the band narrowing parameter is set as a band narrowing factor that indicates a degree of band narrowing in the band narrowing filter processing.

(Supplementary Note 17)

The optical communication method according to supplementary note 15 or 16 further comprising:

measuring signal-to-noise ratios of the optical signals received via the transmission line and transmitting information of the signal-to-noise ratios, and acquiring the band narrowing parameter that is set using information of the signal-to-noise ratios as characteristics of the transmission line from a transmission destination of information of the signal-to-noise ratios.

(Supplementary Note 18)

The optical communication method according to supplementary note 15 or 16 further comprising:

acquiring signal spectra of the optical signals received via the transmission line and transmitting information of the signal spectra, and acquiring the band narrowing parameter that is set based on characteristics of the transmission line extracted from information of the signal spectra from a transmission destination of information of the signal spectra.

(Supplementary Note 19)

The optical communication method according to supplementary note 18, wherein the signal spectra is acquired by monitoring linear equalization processing of the reception signals.

(Supplementary Note 20)

The optical communication method according to any one of supplementary notes 15 to 19 further comprising:

making local oscillator light having wavelengths based on the wavelength-division-multiplexing spacing parameter and the optical signal separated from the multiplexed signal interfere with each other and thereby performing coherent detection.

(Supplementary Note 21)

The optical communication method according to any one of supplementary notes 15 to 20 further comprising:

acquiring the wavelength-division-multiplexing spacing parameter and separating the multiplexed signal into optical signals for the respective channels, based on the wavelength-division-multiplexing spacing parameter.

(Supplementary Note 22)

The optical communication method according to any one of supplementary notes 15 to 20 further comprising:

acquiring a parameter indicating a degree of bandwidth narrowing when spectral shaping that narrows bandwidth of a signal to less than or equal to a baud rate is performed, as the band narrowing parameter that is set based on characteristics of a transmission line transmitting optical signals;

computing a filter coefficient when processing of narrowing the bandwidth of the signals is applied as the band narrowing filter processing;

applying processing of narrowing the bandwidth of the signals as the band narrowing filter processing, based on the computed filter coefficient;

acquiring, as the wavelength-division-multiplexing spacing parameters, information of center wavelengths of optical signals for the respective channels and a spacing between the center wavelengths that are set based on characteristics of the transmission line;

converting the signals the bandwidth of which is narrowed to less than or equal to the baud rate to the optical signals, based on the wavelength-division-multiplexing spacing parameter; and multiplexing the optical signals of a plurality of the channels into a multiplexed signal at spacings less than or equal to the baud rate and outputting the multiplexed signal to the transmission line.

(Supplementary Note 23)

The optical communication method according to supplementary note 22, wherein the band narrowing parameter is set as a band narrowing factor that indicates a degree of band narrowing in the band narrowing filter processing.

(Supplementary Note 24)

The optical communication method according to supplementary note 22 or 23 further comprising:

acquiring, as the wavelength-division-multiplexing spacing parameter, information of a wavelength spacing between the optical signals when a plurality of the optical signals are wavelength-division-multiplexed; and wavelength-division-multiplexing the optical signals at wavelength spacings based on the wavelength-division-multiplexing spacing parameter.

(Supplementary Note 25)

The optical communication method according to any one of supplementary notes 22 to 24 further comprising:

computing the band narrowing parameter and the wavelength-division-multiplexing spacing parameter, based on information of pathways of the transmission line and characteristics of the transmission line; and transmitting the band narrowing parameter and the wavelength-division-multiplexing spacing parameter to both a transmission side and a reception side of the optical signals.

(Supplementary Note 26)

The optical communication method according to supplementary note 25 further comprising:

computing the band narrowing parameter and the wavelength-division-multiplexing spacing parameter, using, as characteristics of the transmission line, information of signal-to-noise ratios of the optical signals acquired from a reception side of the optical signals.

(Supplementary Note 27)

The optical communication method according to supplementary note 25 further comprising:

extracting characteristics of the transmission line from information of signal spectra of the optical signals acquired from a reception side of the optical signals; and computing the band narrowing parameter and the wavelength-division-multiplexing spacing parameter, based on the extracted characteristics of the transmission line.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-255188, filed on Dec. 28, 2016, the disclosure of which is incorporated herein in its entirety by reference.

REFERENCE SIGNS LIST

10 Transmission device
11 Optical transmission means
12 Multiplexing means
13 Transmission coefficient computation means
14 Band narrowing means
15 Electrical/optical conversion means
20 Reception device
21 Separation means
22 Optical reception means
23 Optical/electrical conversion means
24 Reception coefficient computation means
25 Band restoration means
30 Optical transmitter
31 Transmission linear equalizer
32 Band narrowing filter
33 Electrical/optical converter
34 Transmission coefficient computation unit
41 Optical/electrical converter
42 Static linear equalizer
43 Band restoration filter
44 Adaptive equalizer
45 Discriminator
46 Reception coefficient computation unit
51 Multiplexer
52 Demultiplexer
61 Optical/electrical converter
62 Static linear equalizer
63 Band restoration filter
64 Adaptive equalizer
65 Discriminator
66 Reception coefficient computation unit
67 OSNR monitoring unit
71 Optical/electrical converter
72 Static linear equalizer
73 Band restoration filter
74 Adaptive equalizer
75 Discriminator
76 Reception coefficient computation unit
77 Spectrum monitoring unit
100 Transmission device
200 Reception device
300 Communication control device
301 Parameter computation unit
302 Parameter transmission unit
310 Communication control device
311 Parameter computation unit
312 Parameter transmission unit
313 OSNR monitoring result reception unit
320 Communication control device
321 Parameter computation unit
322 Parameter transmission unit
323 Spectrum monitoring result reception unit
400 Transmission line
401 Optical fiber transmission line
402 Communication line
500 Reception device
600 Reception device

The invention claimed is:

1. A reception device comprising:
a demultiplexer which receives a multiplexed signal into which signals of respective channels to which spectral shaping that narrows bandwidth to less than or equal to a baud rate is applied as band narrowing filter processing on a transmission device, based on a band narrowing parameter that, based on characteristics of a transmission line transmitting optical signals, is set as a parameter indicating a degree of bandwidth narrowing of a signal are wavelength-division-multiplexed at spacings less than or equal to the baud rate and separates the multiplexed signal into the optical signals for the respective channels; and
a plurality of optical receivers each of which comprises an optical/electrical converter which acquires, as a wavelength-division-multiplexing spacing parameter, information of center wavelengths of the optical signals for the respective channels and a spacing between the center wavelengths that are set based on characteristics of the transmission line, converts the optical signal of the assigned channel to an electrical signal, based on the wavelength-division-multiplexing spacing parameter, and outputs the electrical signal as a reception signal, a reception coefficient computer which acquires the band narrowing parameter and, based on the band narrowing parameter, computes a filter coefficient when processing having inverse characteristics to those of the band narrowing filter processing applied on the transmission device is applied to the reception signal as band restoration filter processing, and a band restorer which applies the band restoration filter processing to the reception signal, based on the filter coefficient computed by the reception coefficient computer and thereby restores a band of the reception signal.

2. The reception device according to claim 1, wherein the band narrowing parameter is set as a band narrowing factor that indicates a ratio of a bandwidth after the band narrowing filter processing to a bandwidth matching a baud rate.

3. The reception device according to claim 1 further comprising
a noise measurer which measures a signal-to-noise ratio of the optical signal received via the transmission line and transmits information of the signal-to-noise ratio, wherein
each reception coefficient computer acquires the band narrowing parameter that is set using information of the signal-to-noise ratio as characteristics of the transmission line from a transmission destination of information of the signal-to-noise ratio.

4. The reception device according to claim 1 further comprising
a spectrum acquirer which acquires a signal spectrum of the optical signal received via the transmission line and transmits information of the signal spectrum, wherein
each reception coefficient computer acquires the band narrowing parameter that is set based on characteristics of the transmission line extracted from information of the signal spectrum from a transmission destination of information of the signal spectrum.

5. The reception device according to claim 4, wherein the spectrum acquirer monitors linear equalization processing of the reception signal and acquires the signal spectrum.

6. The reception device according to claim 1, wherein each optical/electrical converter makes local oscillator light having a wavelength based on the wavelength-division-multiplexing spacing parameter and the optical signal input from the separation unit interfere with each other and thereby performs coherent detection.

7. The reception device according to claim 1, wherein the demultiplexer acquires the wavelength-division-multiplexing spacing parameter and separates the multiplexed signal into optical signals for the respective channels, based on the wavelength-division-multiplexing spacing parameter.

8. An optical communication system comprising:
a transmission device which comprises
a plurality of optical transmitters each of which comprises a transmission coefficient computer which acquires a parameter indicating a degree of bandwidth narrowing when spectral shaping that narrows bandwidth of a signal to less than or equal to a baud rate is performed, as a band narrowing parameter that is set based on characteristics of a transmission line transmitting optical signals and computes a filter coefficient when processing of narrowing the bandwidth of the signal is applied as band narrowing filter processing, a band narrowing unit which, based on the filter coefficient computed by the transmission coefficient computer, applies processing of narrowing the bandwidth of the signal as band narrowing filter processing, and an electrical/optical converter which acquires, as a wavelength-division-multiplexing spacing parameter, information of center wavelengths of the optical signals for respective channels and a spacing between the center wavelengths that are set based on characteristics of the transmission line and converts the signal the bandwidth of which is narrowed to less than or equal to the baud rate by the band narrowing unit to the optical signal, based on the wavelength-division-multiplexing spacing parameter; and
a multiplexer which multiplexes the optical signals of the channels output from the plurality of optical transmitters into a multiplexed signal, at spacing less than or equal to the baud rate and outputs the multiplexed signal to the transmission line;
a reception device according to claim 1; and
a communication controller which comprises a parameter computer which, based on information of pathways of a transmission line for optical signals and characteristics of the transmission line, computes a band narrowing parameter that indicates information of bandwidth when spectral shaping that narrows the bandwidth to less than or equal to a baud rate is applied to signals of respective channels and a wavelength-division-multiplexing spacing parameter that indicates center wavelengths of the optical signals for the respective ones of a plurality of the channels and a wavelength spacing between the center wavelengths; and
a parameter transmitter which transmits the band narrowing parameter and the wavelength-division-multiplexing spacing parameter to both the transmission device and the reception device of the optical signals, wherein the communication controller transmits the band narrowing parameter and the wavelength-division-multiplexing spacing parameter to both the transmission device and the reception device,
the transmission device receives the band narrowing parameter and the wavelength-division-multiplexing spacing parameter form the communication controller, converts signals to which the band narrowing filter processing is applied based on the band narrowing parameter to the optical signals, based on the wavelength-division-multiplexing spacing parameter, and multiplexes the optical signals of a plurality of the channels into the multiplexed signal and transmits the multiplexed signal to the transmission line, and
the reception device receives the band narrowing parameter and the wavelength-Division-multiplexing spacing parameter from the communication controller, converts the optical signals into which the multiplexed signal received from the transmission device via the transmission line are separated to electrical signals, based on the wavelength-division-multiplexing spacing parameter, and applies the band restoration filter processing to reception signals that have been converted to the electrical signals, based on the band narrowing parameter.

9. A transmission device comprising:
a plurality of optical transmitters each of which comprises a transmission coefficient computer which acquires a parameter indicating a degree of bandwidth narrowing when spectral shaping that narrows bandwidth of a signal to less than or equal to a baud rate is performed, as a band narrowing parameter that is set based on characteristics of a transmission line transmitting optical signals and computes a filter coefficient when processing of narrowing the bandwidth of the signal is applied as band narrowing filter processing, a band narrowing unit which, based on the filter coefficient computed by the transmission coefficient computer, applies processing of narrowing the bandwidth of the signal as band narrowing filter processing, and an electrical/optical converter which acquires, as a wavelength-division-multiplexing spacing parameter, information of center wavelengths of the optical signals for respective channels and a spacing between the center wavelengths that are set based on characteristics of the transmission line and converts the signal, the bandwidth of which is narrowed to less than or equal to the baud rate by the band narrowing unit to the optical signal, based on the wavelength-division-multiplexing spacing parameter; and
a multiplexer which multiplexes the optical signals of the channels output from the plurality of optical transmitters into a multiplexed signal, at spacings less than or equal to the baud rate and outputs the multiplexed signal to the transmission line.

10. The transmission device according to claim 9, wherein the band narrowing parameter is set as a band narrowing factor that indicates a degree of band narrowing in the band narrowing filter processing.

11. The transmission device according to claim 9, wherein the multiplexer acquires, as the wavelength-division-multiplexing spacing parameter, information of a wavelength spacing between the optical signals when the optical signals that the plurality of optical transmission units generated are multiplexed and multiplexes the optical signals at wavelength spacings based on the wavelength-division-multiplexing spacing parameter.

12. An optical communication method comprising:
separating a multiplexed signal into which signals of respective channels to which spectral shaping that narrows bandwidth of a signal to less than or equal to a baud rate is applied as band narrowing filter processing, based on a band narrowing parameter that, based on characteristics of a transmission line transmitting optical signals, is set as a parameter indicating a degree of bandwidth narrowing of a signal are multiplexed at spacings less than or equal to the baud rate into optical signals for the respective channels;
acquiring information of center wavelengths of optical signals for the respective channels and a spacing between the center wavelengths that are set based on characteristics of a transmission line, as a wavelength-division-multiplexing spacing parameter, converting the optical signals of the assigned channels to electrical signals, based on the wavelength-division-multiplexing spacing parameter, and outputting the electrical signals as reception signals,
acquiring the band narrowing parameter and, based on the band narrowing parameter, computing a filter coefficient when processing having inverse characteristics to those of the band narrowing filter processing is applied to the reception signals as band restoration filter processing, and
applying the band restoration filter processing to the reception signals, based on the computed filter coefficient and thereby restoring bands of the reception signals.

13. The optical communication method according to claim 12, wherein
the band narrowing parameter is set as a band narrowing factor that indicates a degree of band narrowing in the band narrowing filter processing.

14. The optical communication method according to claim 12 further comprising:
measuring signal-to-noise ratios of the optical signals received via the transmission line and transmitting information of the signal-to-noise ratios, wherein
the band narrowing parameter that is set using information of the signal-to-noise ratios as characteristics of the transmission line is acquired from a transmission destination of information of the signal-to-noise ratios.

15. The optical communication method according to claim 12 further comprising:
acquiring signal spectra of the optical signals received via the transmission line and transmitting information of the signal spectra, wherein
the band narrowing parameter that is set based on characteristics of the transmission line extracted from information of the signal spectra is acquired from a transmission destination of information of the signal spectra.

16. The optical communication method according to claim 15, wherein
the signal spectra is acquired by monitoring linear equalization processing of the reception signals.

17. The optical communication method according to claim 12 further comprising:
making local oscillator light having wavelengths based on the wavelength-division-multiplexing spacing parameter and the optical signal separated from the multiplexed signal interfere with each other and thereby performing coherent detection.

18. The optical communication method according to claim 12, wherein
the multiplexed signal is separated into optical signals for the respective channels, based on the wavelength-division-multiplexing spacing parameter.

19. The optical communication method according to claim 12 further comprising:
acquiring a parameter indicating a degree of bandwidth narrowing when spectral shaping that narrows bandwidth of a signal to less than or equal to a baud rate is performed, as the band narrowing parameter that is set based on characteristics of a transmission line transmitting optical signals;
computing a filter coefficient when processing of narrowing the bandwidth of the signals is applied as the band narrowing filter processing;
applying processing of narrowing the bandwidth of the signals as the band narrowing filter processing, based on the computed filter coefficient;
acquiring, as the wavelength-division-multiplexing spacing parameters, information of center wavelengths of optical signals for the respective channels and a spacing between the center wavelengths that are set based on characteristics of the transmission line;
converting the signals, the bandwidth of which is narrowed to less than or equal to the baud rate to the optical signals, based on the wavelength-division-multiplexing spacing parameter; and
multiplexing the optical signals of a plurality of the channels into a multiplexed signal at spacings less than or equal to the baud rate and outputting the multiplexed signal to the transmission line.

20. The optical communication method according to claim 19, wherein
the band narrowing parameter is set as a band narrowing factor that indicates a degree of band narrowing in the band narrowing filter processing.

* * * * *